May 31, 1960 H. LERNER 2,938,212
PNEUMATIC TACKER
Filed April 20, 1953 12 Sheets-Sheet 1
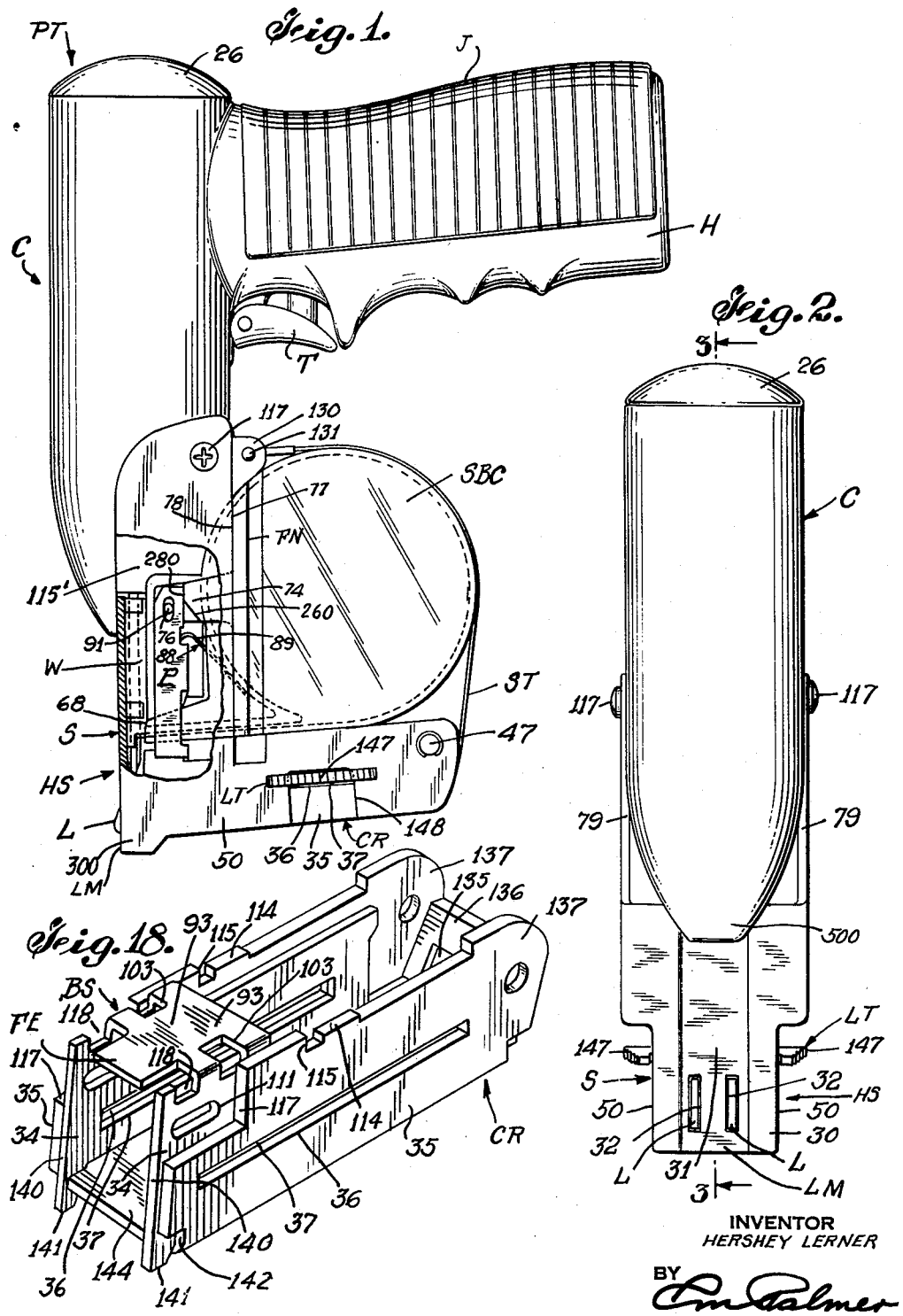
INVENTOR
HERSHEY LERNER
BY
*Cm Palmer*
ATTORNEY

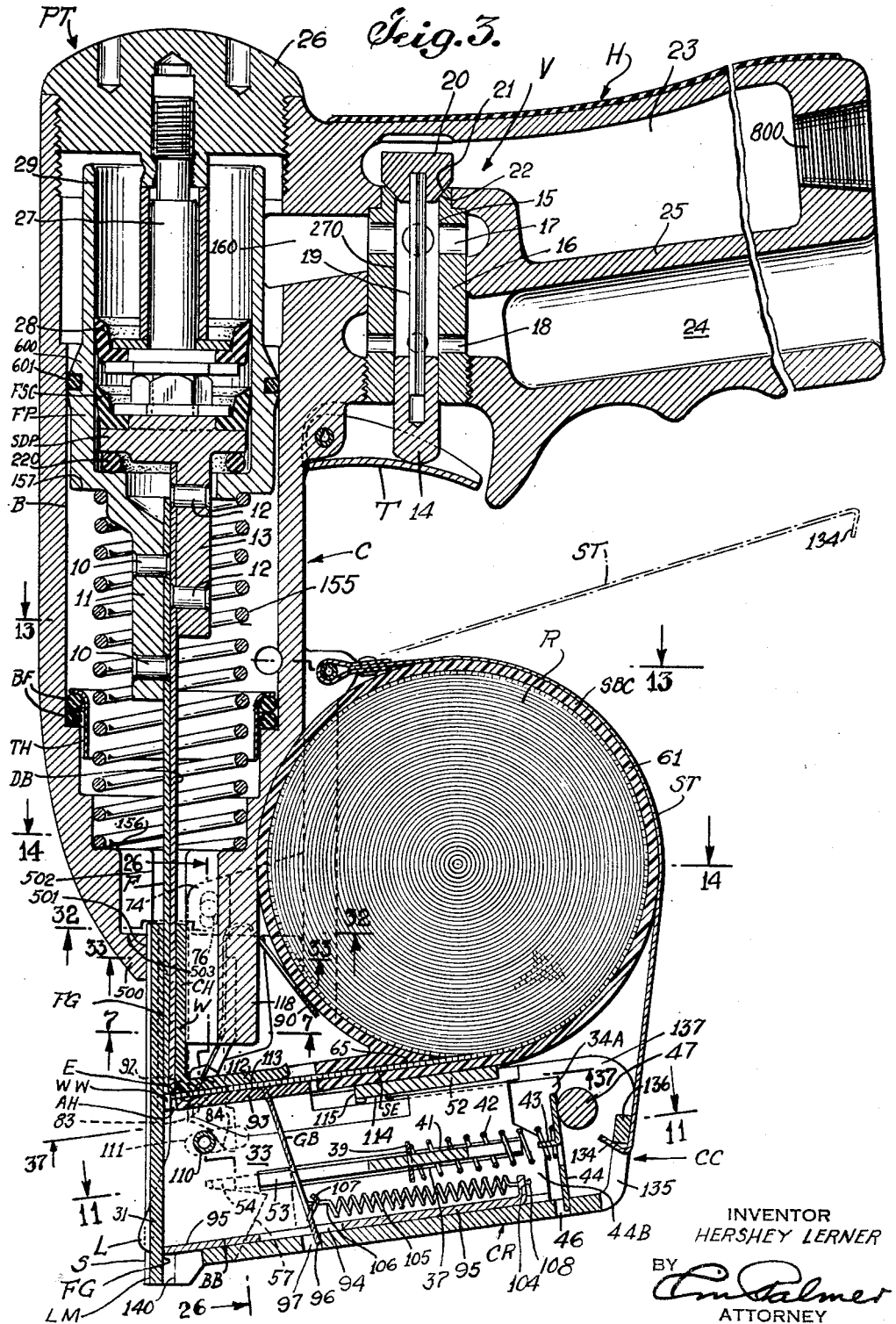

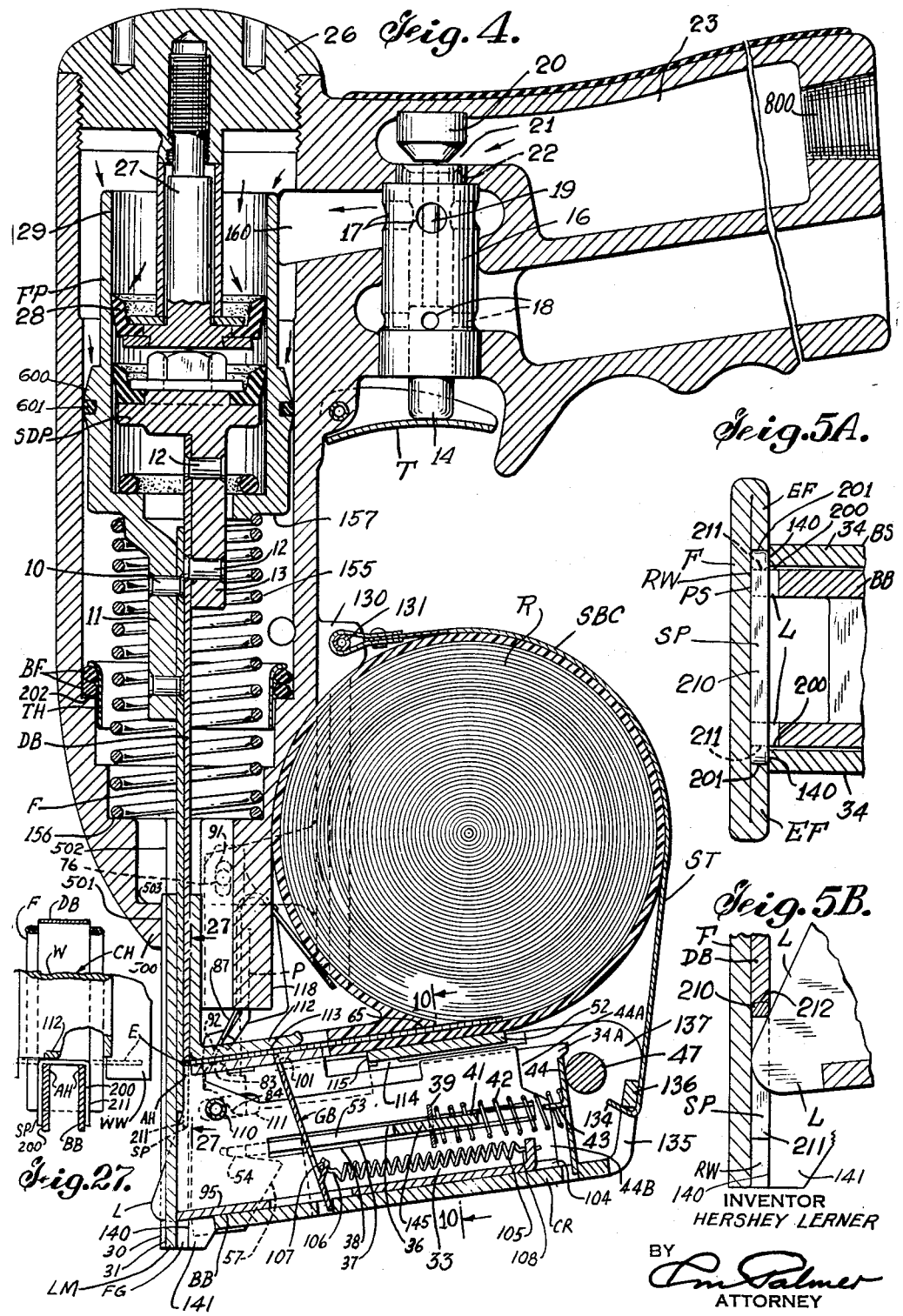

May 31, 1960 — H. LERNER — 2,938,212
PNEUMATIC TACKER
Filed April 20, 1953 — 12 Sheets-Sheet 4
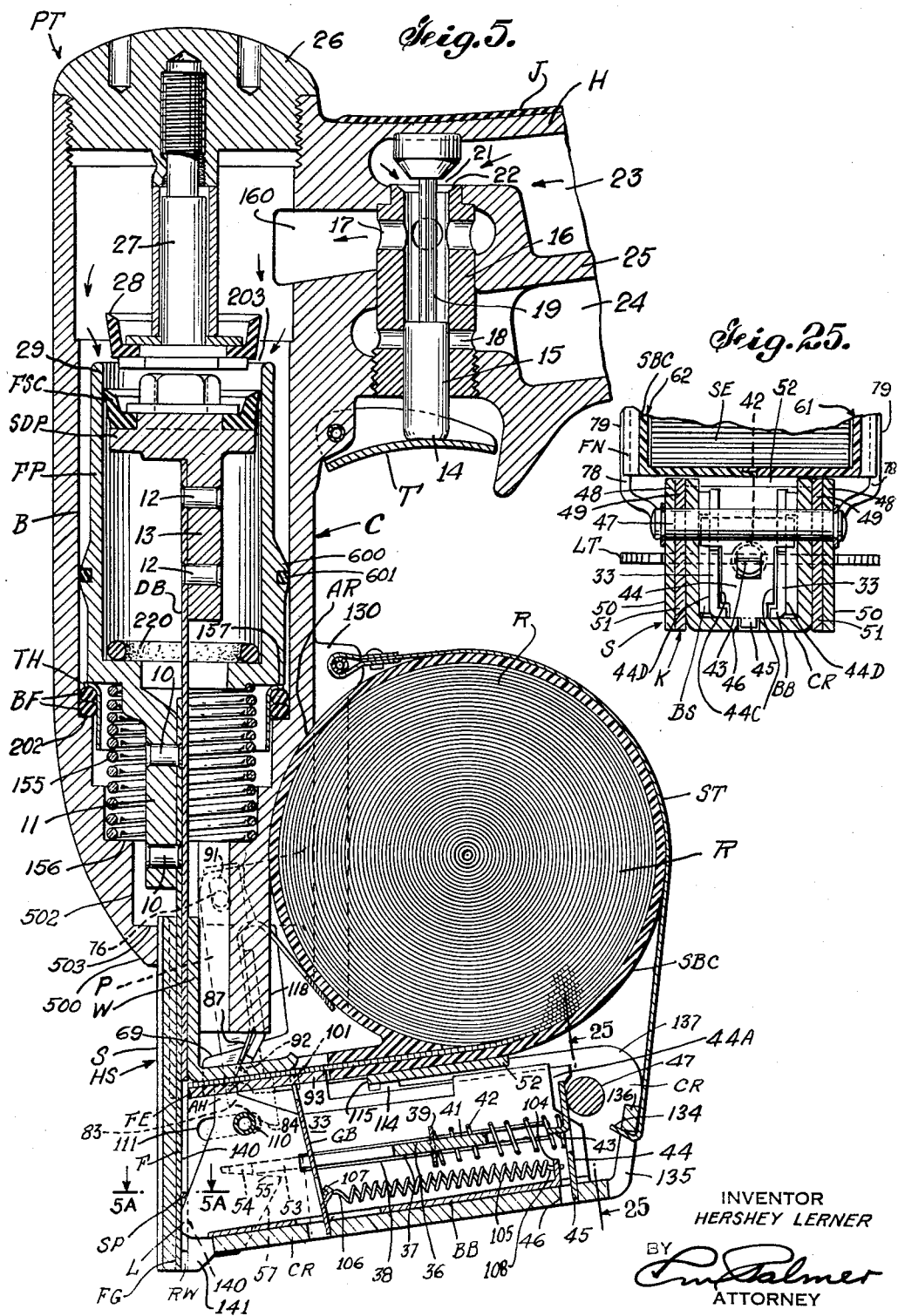
INVENTOR
HERSHEY LERNER
ATTORNEY

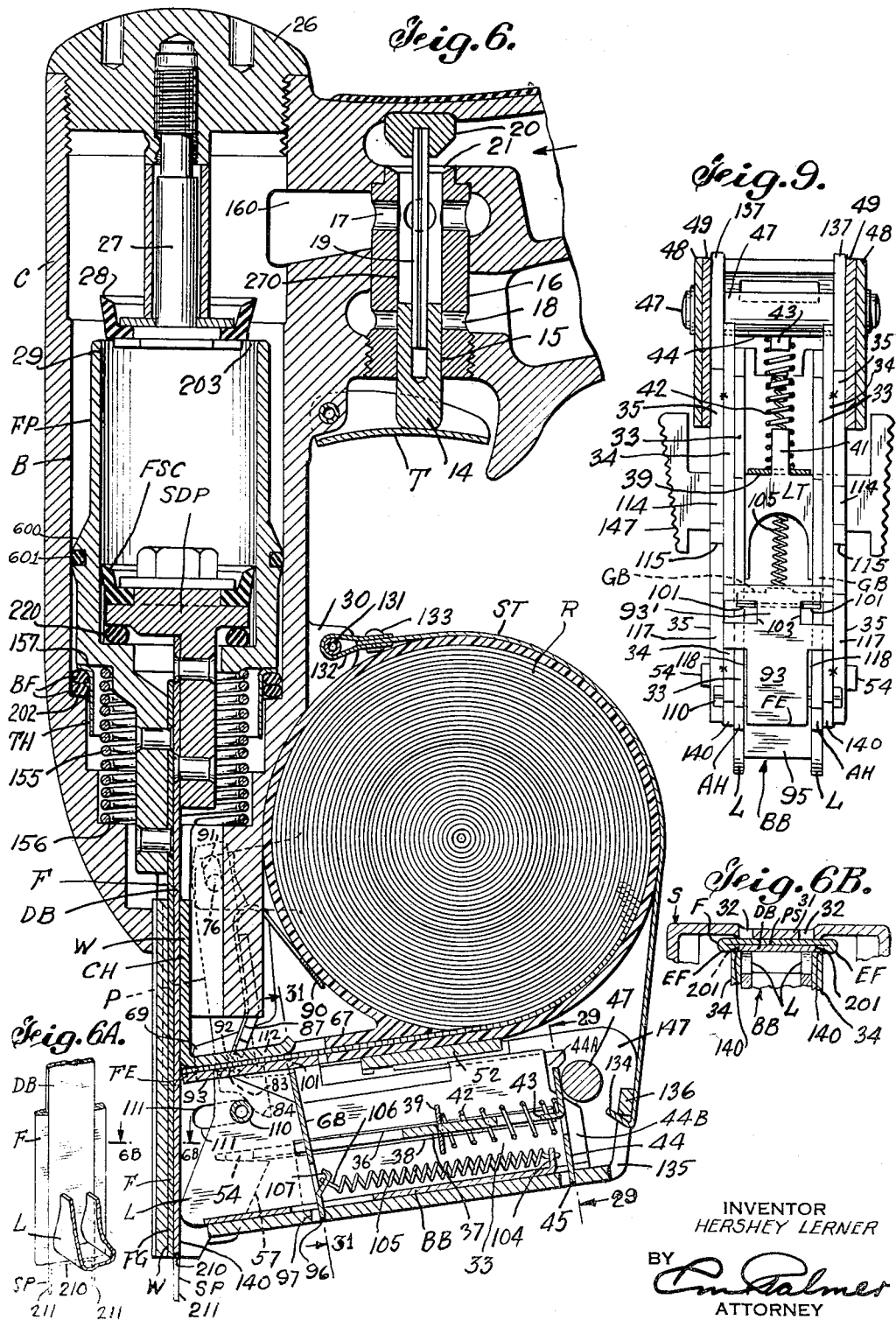

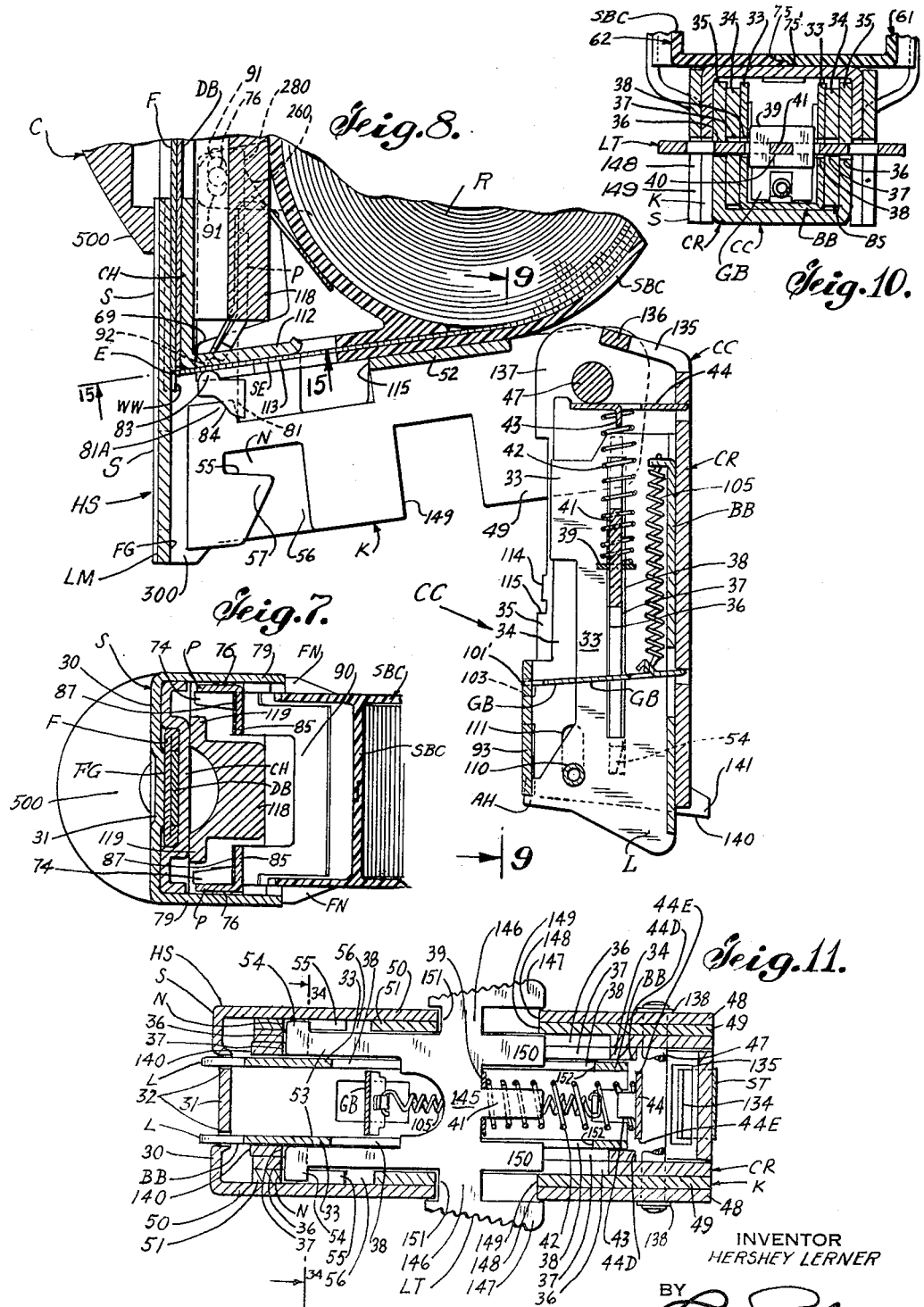

May 31, 1960  H. LERNER  2,938,212
PNEUMATIC TACKER
Filed April 20, 1953  12 Sheets-Sheet 7
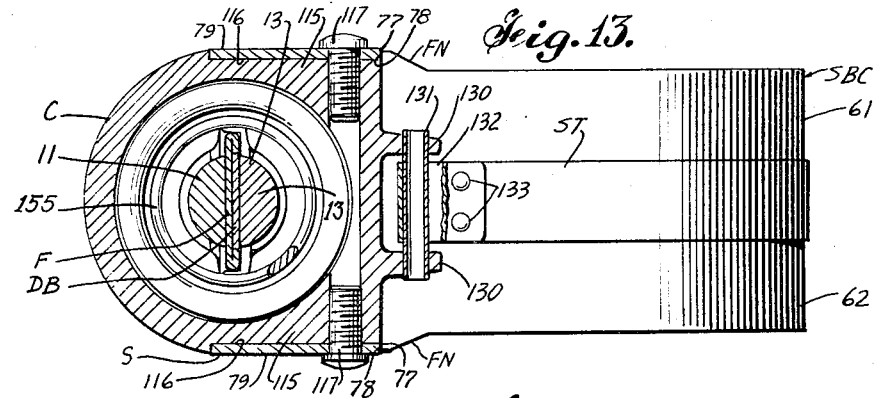
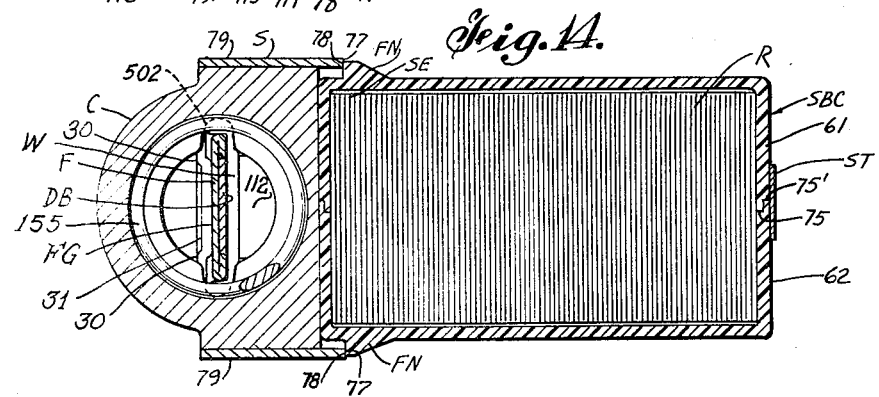
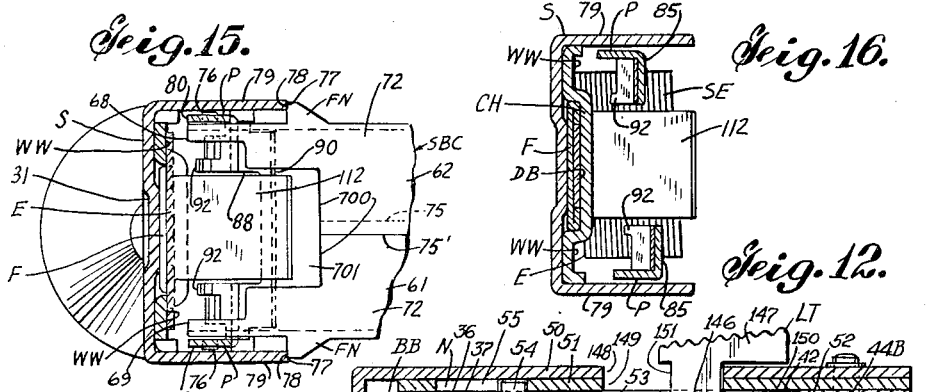
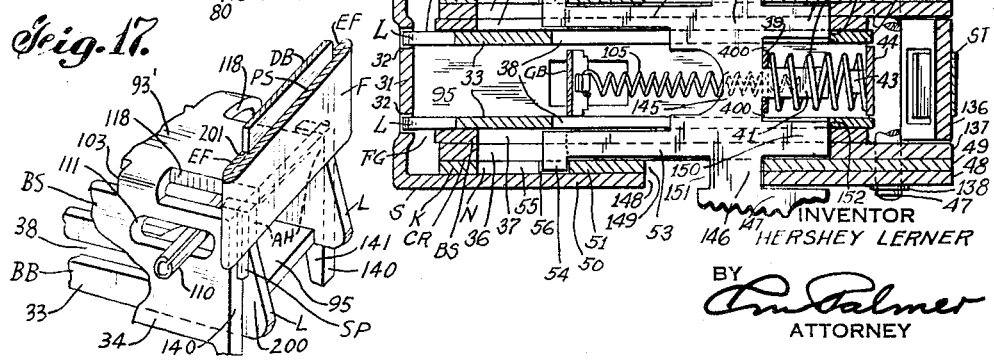
INVENTOR
HERSHEY LERNER
BY
Wm Palmer
ATTORNEY

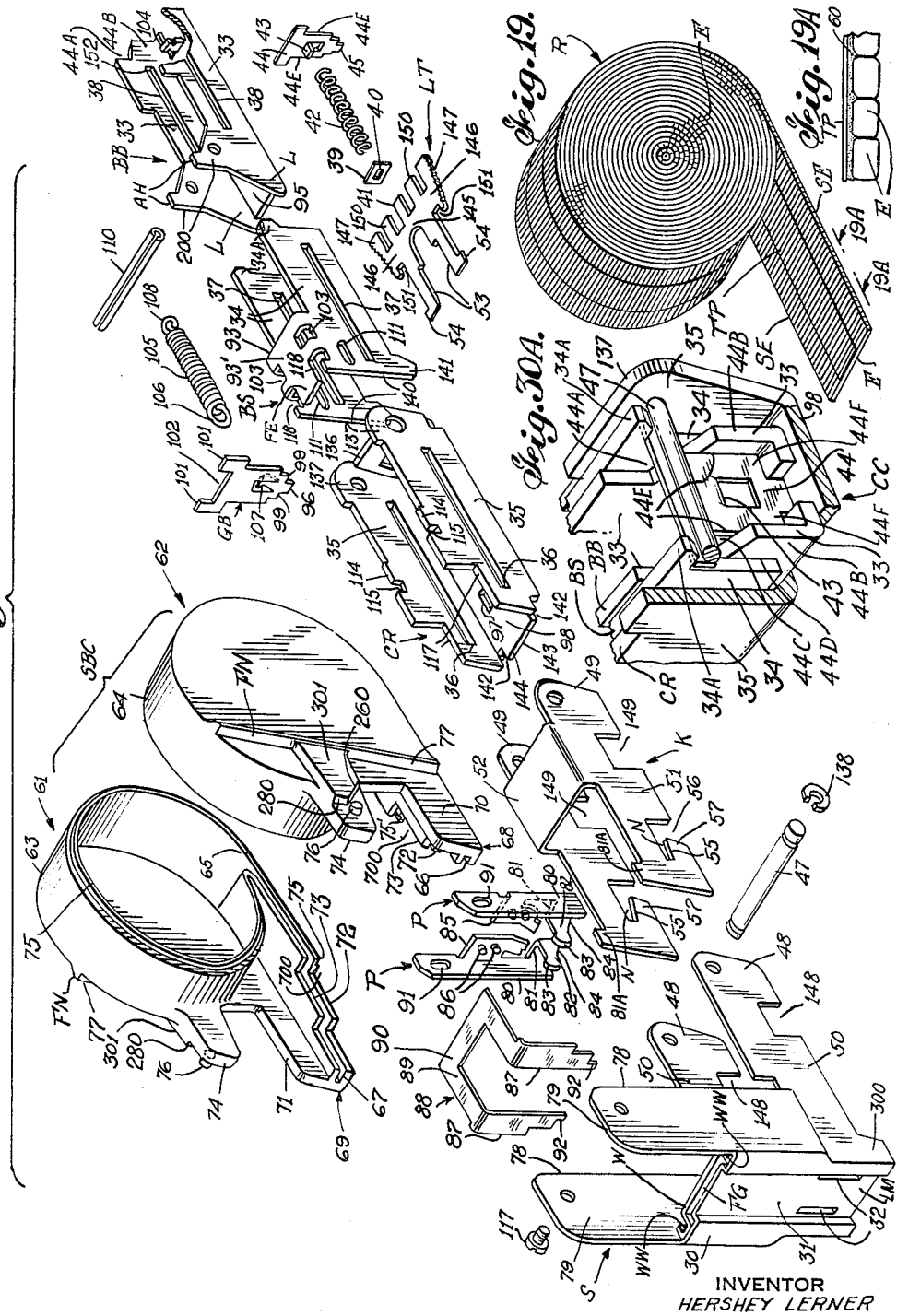

May 31, 1960 H. LERNER 2,938,212
PNEUMATIC TACKER
Filed April 20, 1953 12 Sheets-Sheet 9
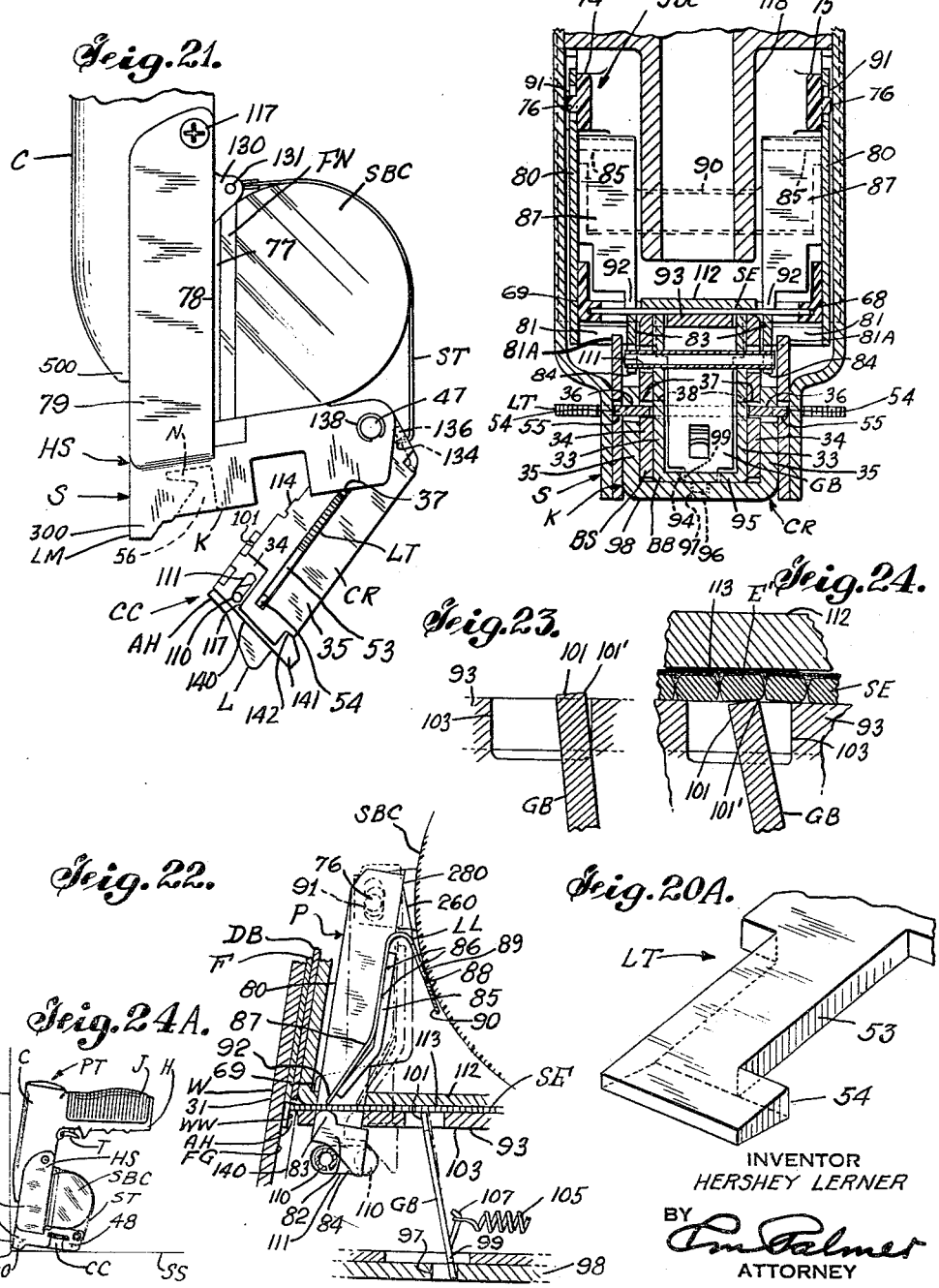
INVENTOR
HERSHEY LERNER
BY
Tru Palmer
ATTORNEY

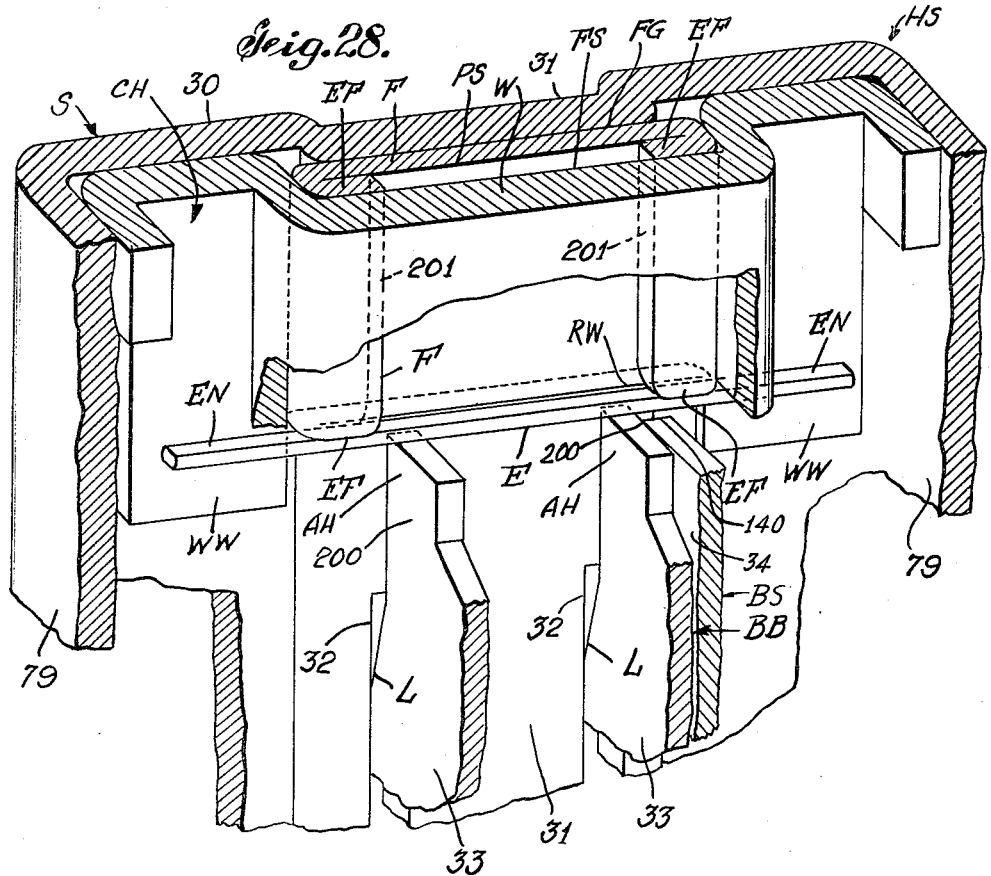
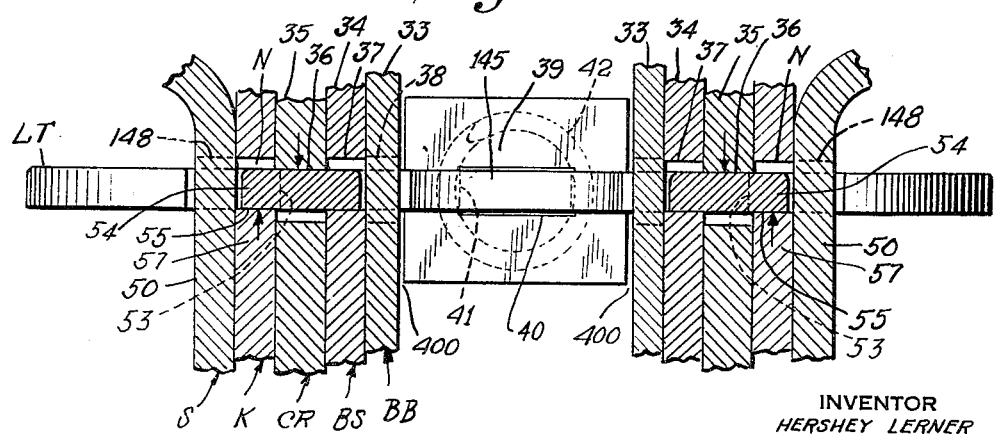

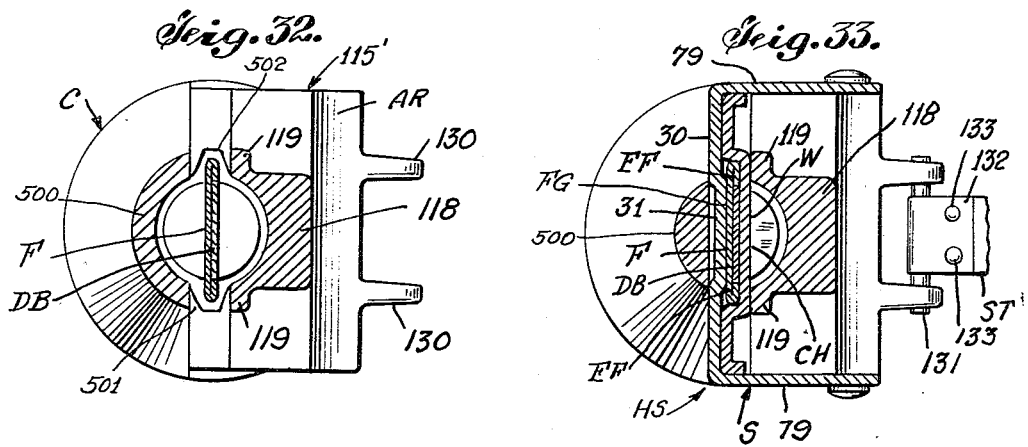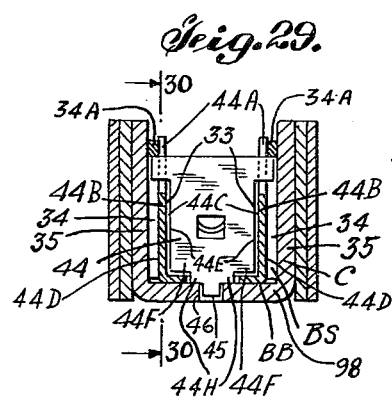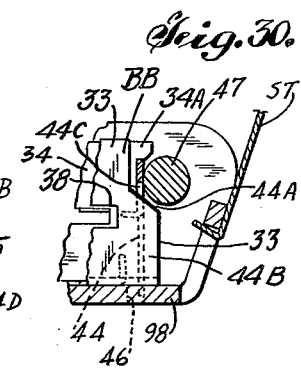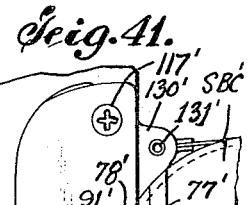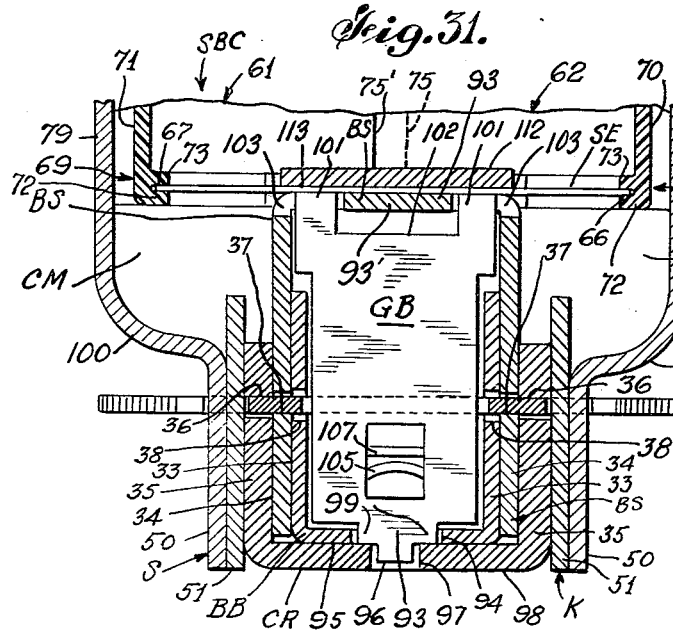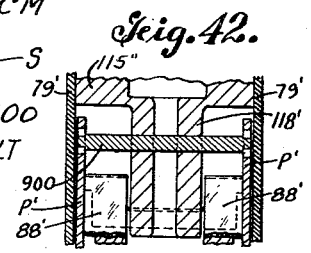

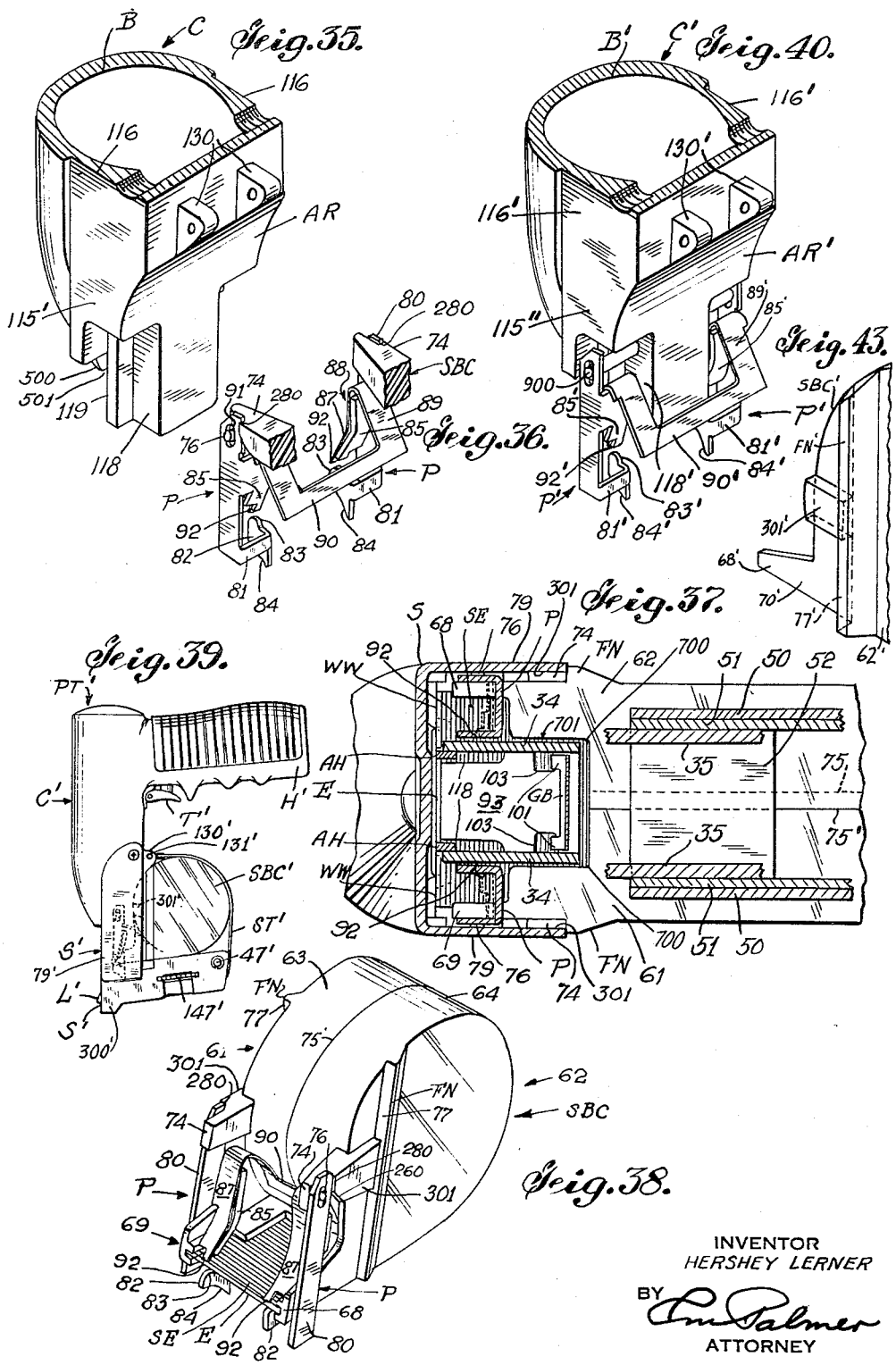

United States Patent Office 2,938,212
Patented May 31, 1960

2,938,212
PNEUMATIC TACKER

Hershey Lerner, Bayside, N.Y., assignor, by mesne assignments, to Inventions Management Corporation, Raleigh, N.C., a corporation of North Carolina Filed Apr. 20, 1953, Ser. No. 349,852

94 Claims. (Cl. 1—44.4)

The subject matter of this invention is a stapling machine and more specifically is concerned with a functionally and structurally improved pneumatic tacker. One important object of the invention is concerned with a highly serviceable tacker which can conveniently hold at least five thousand staple elements in close compact fashion in the form of a roll in a small container utilized as a disposable cartridge which is easy to load on and into the tacker and which is easy to unload when the staple element roll is used up. Another important object is to provide a novel pneumatic tacker which is easy to manufacture to the end that the parts thereof do not require close tolerances. Specifically another object resides in the provision of a novel tacker requiring no special skill for its effectiveness in respect to efficient operation and the staple driving means thereof is independent of the rate of speed of actuation of the trigger controlling the admission of air pressure into the cylinder of the tacker. A further specific object is realized in the provision of a tacker which can be "cornered," namely, the staple ejected can be driven into right angle corners by reason of the acute angle formed by the cylinder and the base or case of the tacker, thus permitting automatic positioning of the staple raceway of the tacker into the corner while the cylinder thereof is appreciably spaced from a wall forming in part the corner and even such corner positioning can take place while the former and driving blades are located along the center line of the forming and driving pistons within the cylinder. A further particular object is concerned with a tacker wherein the staple raceway is formed by separable parts adapted to be swung apart for prompt access thereto and consequently adapted for easy cleaning. Another object is to employ in the disposable cartridge a foldable and flexible belt in the form of a roll of rectilinear and resiliently connected wire elements with the foremost element thereof adapted to be successively fed over the forward or anvil end of a linearly guided bending block and subsequently bent against the sides of the anvil end of the bending block to form an inverted U shaped staple after which the formed staple is driven out of the tacker. Another object is to form the U shaped staple from the foremost rectilinear wire element of the resilient and flexible staple element strip issuing from the roll in the first part of the down stroke of a pneumatically actuated compound piston of the tacker and subsequently drive on the remaining part of this same downstroke the formed staple out of the tacker and into the material to be fastened. Another object resides in providing the compound piston with a channel shaped former to bend the foremost wire element of the staple element strip over the slidably guided bending block, and with a driving blade for subsequently forcing and ejecting the formed staple out of the raceway of the tacker. Another object is to operate the driving blade at a high rate of speed, consequently reducing the recoil of the tacker. Another specific object is to expose the staple driving piston to predetermined maximum air pressure pursuant to the full stroke of the forming piston, thus insuring full benefit of the maximum pressure desired on the driving piston irrespective of the time utilized in manipulating the trigger for initiating admission of air into the forming piston. Another object is to provide an effective staple element belt feeding means for presenting the foremost staple element of the staple element strip over the front anvil part of the slidable but spring controlled bending block after each complete cycle of the compound piston, namely, a cycle which comprises; first, bending or forming of a rectilinear staple element into an inverted U shaped staple; second, driving the formed staple out of the tacker; and lastly, the return of both the former and driving blades to their normal elevated positions. Another object is to utilize the forming blade to closely confine the formed staple against play when in the raceway, thus aiding to preclude buckling of the formed staple as it is forced through the raceway, thereby further insuring greater penetration of the driven staple into the material to be secured. Another object is to insure that the foremost staple element of the staple element strip issuing from the cartridge will automatically line itself substantially parallel to the staple raceway prior to the forming operation. More specifically, another object resides in the provision of spring controlled pivoted and slidable pawls for shifting staple element strip forwardly at the conclusion of each cycle of the compound piston. Another object resides in the provision of a novel cartridge of the type referred to for storing the staple element belt in the form of a roll adapted to be unwound to characterize a staple element strip guided linearly towards the staple raceway of the tacker and in part guided by spaced rails or slotted arms extending forwardly from the bottom wall of the cartridge. Another object comprehends the utilization of an adequate reservoir in the handle of the tacker or fastener ejecting embodiments herein disclosed having sufficient capacity at all times to contain at least a high pressure pneumatic charge or volume appropriate to operate the forming piston and thereafter the staple driving piston during the first half of a complete operating cycle, that is, the volume of the reservoir is at least equal to the volume of air required to actuate the forming piston and thereafter also effectively adequate to operate the staple driving piston on the same down stroke of the compound piston herein described and of course, such action is independent of the length of the hose connection to the handle or independent of involuntary cross sectional reduction of the hose in case the latter be kinked, or even independent of restrictions for any reason in regard to normal predetermined volume of air required to flow into the handle. A further object is to provide a pneumatic cylinder wherein the compound piston which embodies a forming piston and a driving piston nested within and guided by the forming piston, is tiltable relative to the bore of the cylinder and consequently self alining to compensate for the uncontrollable manufacturing tolerances in the parts constituting guide means for the former blade carried by the forming piston and the driver blade carried by the driving piston. Another object resides in the provision of a pneumatic tacker characterized by, a cylinder for carrying the compound piston of the character referred to, a base for guiding a spring controlled reciprocable staple element bending block, and a housing secured to the cylinder and swingably carrying the base, the arrangement being such that the staple element belt carrying cartridge is removably seated on and in part concealed by the housing, and a resilient strap is employed to hold the cartridge on and against the housing. More particularly, another object is to provide spring controlled staple element swingable and slidable feeding pawls permanently associated with the disposable cartridge to facilitate loading thereof as a unit in the tacker. A further object resides in the utilization of a slidable latch carried by the swingable base for interlocking with fixed keeper means secured to the housing. Another object is concerned with the provision of means for automatically disconnecting the resilient strap from the swingable base upon unlocking the slidable latch from the keeper means and pursuant to swingable displacement of the base out of the housing. Another important object is to utilize the slidable latch for automatically feeding the staple element strip to present the foremost element thereof across the raceway upon completion of the closing of the base when swung into the housing of the tacker. A further object is to prevent the staple element strip from shifting rearwardly when the foremost staple element thereof is formed into a staple and subsequently driven out of the tacker. Another object is realized in the provision of a case or base having a slidably guided bending block shiftable relative to a carrier of the base and including pin means responsive on the down stroke of the former blade and driving blade to actuate the pivoted staple element belt feeding pawls against the resistance of appropriate spring means which automatically retracts the feeding pawls on the completion of the return of both the former and driving blades to shift the staple element strip bodily forwardly against stop means in alinement with and above although contiguous to the staple raceway whereby the foremost staple element of the staple strip is supported by the anvil portions traversing the staple raceway. Other important advantages, features and salient aspects of the invention will appear from the following detailed specifications considered in the light of the accompanying drawings wherein:

Fig. 1 is a side elevational view of the pneumatic tacker according to my invention and partly broken away to illustrate the internal construction.

Fig. 2 is a front elevational view of Fig. 1.

Fig. 3 is a vertical sectional view on the line 3—3 of Fig. 2, illustrating the staple element forming and driving means in a neutral or fully raised position at which time the compressed air intake port is closed and the exhaust ports are open to the atmosphere.

Fig. 4 is a view substantially similar to Fig. 3 but showing the intake port open, the staple element forming means partly depressed, and the staple driving means still in its neutral or fully raised position.

Fig. 5 is a view substantially similar to Fig. 4, however, depicting the staple forming means fully depressed and the staple driving means about to move downwardly to drive the formed staple out of the staple guideway.

Fig. 5A is a section along the line 5A—5A of Fig. 5 primarily to illustrate how the formed staple is supported and prevented from buckling even towards the completion of the down stroke of the staple driving blade.

Fig. 5B is a fragmentary enlarged view of Fig. 5 but showing the driving blade meeting the formed staple.

Fig. 6 is a view similar to Fig. 5 showing the staple driving means fully depressed and ejecting the formed staple.

Fig. 6A is a fragmentary perspective view of Fig. 6, on a smaller scale and illustrating the formed staple fully ejected.

Fig. 6B is a sectional view on the line 6B—6B of Fig. 6.

Fig. 7 is a transverse sectional view on the line 7—7 of Fig. 3.

Fig. 8 is a fragmentary view of Fig. 5 illustrating the pivoted base or swing case unlocked from the keeper and swung downwardly and away from the front end of the housing to which the keeper is secured.

Fig. 9 is a plan view of the swingable base or bending block guide taken on the line 9—9 of Fig. 8.

Fig. 10 is a transverse sectional view on the line 10—10 of Fig. 4 to illustrate the locating block for the slidable latch.

Fig. 11 is a horizontal sectional view on the line 11—11 of Fig. 3 illustrating the bending block guide or base locked against downward pivotal displacement.

Fig. 12 is a view similar to Fig. 11 illustrating the latch shifted rearwardly to unlock the base from the housing at which time the bending block guide has been shifted rearwardly by the slidable latch, which action causes the staple element belt feeding means to be swung rearwardly.

Fig. 13 is a horizontal sectional view on the bent line 13—13 of Fig. 3.

Fig. 14 is a horizontal sectional view on the line 14—14 of Fig. 3.

Fig. 15 is a horizontal sectional view on the line 15—15 of Fig. 8 illustrating the staple element strip feeding pawls alined for successively feeding the foremost staple elements of the staple element strip parallel to the staple element raceway.

Fig. 16 is a sectional view illustrating the feeding pawls out of alinement but adapted automatically to shift or twist the staple element belt to present the foremost staple element thereof parallel to the staple element raceway defined by the former and spaced front faces of the fixed staple element strip support.

Fig. 17 is a fragmentary perspective view illustrating the foremost staple element formed over and against the anvil heads or front portions of the slidable bending block to characterize an inverted U-shaped staple.

Fig. 18 is a perspective view of the swingable base, illustrating primarily the outside carrier and its fixed staple element strip guide.

Fig. 19 is a positive view of the elastic and flexible staple element belt formed into a roll and illustrating a part of this roll, namely, the staple element strip, unwound but adapted to be threaded into spaced guide rails of the disposable belt carrying cartridge.

Fig. 19A is an enlarged side elevational view on the line 19A—19A of Fig. 19.

Fig. 20 is an exploded perspective view of the housing or sheath, swingable base or swing case, the staple belt carrying cartridge, the staple element belt feeding means and inter alia, the slidable latch for interlocking with the keeper to hold the base closed and for actuating the belt feeding means when unlocked from the keeper when the base is closed.

Fig. 20A is a fragmentary and enlarged view of the latch illustrated in Fig. 20.

Fig. 21 is a fragmentary view of Fig. 1 on a smaller scale, showing the swingable base or swing case swung out of the major part of the housing sheath and about ready to automatically release the leaf spring holding the staple element belt cartridge in part within this housing.

Fig. 22 is a view illustrating the swingable staple element belt feeding means about to be displaced rearwardly by the actuating pin of the slidable bending block.

Fig. 23 is an enlarged fragmentary view of Fig. 22 illustrating the biased relation of the pivoted staple element gripping or braking pawl, shown slightly projecting above the staple element belt guide or support when the latter is not supporting a staple element strip.

Fig. 24 is an enlarged fragmentary view of Fig. 22 illustrating the braking pawl wedging against the staple element strip to preclude its rearward displacement in its guide channel.

Fig. 24A is a side elevational view of the tacker on a smaller scale showing the oblique angle made by the cylinder and the swingable base when the latter is held locked within the housing by the latch and this view also illustrates the front nose of the tacker disposed in a corner where fastening by a staple is desired.

Fig. 25 is a sectional view on the line 25—25 of Fig. 5.

Fig. 26 is a sectional view taken on the bent line 26—26 of Fig. 3.

Fig. 27 is a fragmentary view on the line 27—27 of Fig. 4 and shown partly broken away.

Fig. 28 is an enlarged perspective view illustrating the position of the foremost staple element of the staple element strip against the rear stop face of the channel shaped guide and about to be bent over the anvil heads of the slidable bending block.

Fig. 29 is a sectional view on the line 29—29 of Fig. 6 illustrating the rear part of the spaced sides of the slidable bending block received through spaced slots defined by the rear anchored block and the spaced sides of the staple element belt support.

Fig. 30 is a sectional view on the line 30—30 of Fig. 29.

Fig. 30A is a fragmentary perspective view of the swingable base showing the slidable bending block displaced in its fully rearward position to project into spaced relief slots defined by the fixed block at the rear of the base and the spaced sides of the staple element support.

Fig. 31 is an enlarged sectional view on the line 31—31 of Fig. 6 illustrating the spaced fingers of the gripping pawl braking the staple element strip.

Fig. 32 is a sectional view substantially on the line 32—32 of Fig. 3, to illustrate the centrally arranged relief slot in the casting and its reduced portions.

Fig. 33 is a sectional view on the line 33—33 of Fig. 3 to show guideway for former and driving blades.

Fig. 34 is a sectional view on the bent line 34—34 of Fig. 11 showing the manner in which the impact by the carrier on the slidable latch on each down stroke of the compound piston is absorbed by the keeper, to avoid accidental opening of the swingable base.

Fig. 35 is a fragmentary perspective view of the casting or forming piston guiding cylinder.

Fig. 36 is a fragmentary perspective view of the staple element belt cartridge and its swingable and slidably guided staple element strip feeding pawls carrying a looped spring adapted to be energized or tensioned by the cartridge.

Fig. 37 is a sectional view on the line 37—37 of Fig. 3.

Fig. 38 is a perspective view of the staple element belt cartridge permanently carrying the spring controlled staple element strip feeding pawls.

Fig. 39 is a side elevational view of a slightly modified pneumatic tacker according to my invention but depicting the staple element feeding pawls permanently carried by the depending bearing of the casting instead of the staple element belt cartridge.

Fig. 40 is a fragmentary perspective view on a larger scale of the casting shown in Fig. 39 and illustrating the swingable and slidable staple element strip feeding means secured to the depending bearing of the casting or cylindrical casing, and Fig. 41 is a fragmentary but enlarged view of Fig. 39, showing parts broken away to illustrate staple element strip feeding means carried by the casting.

Fig. 42 is a sectional view on the line 42—42 of Fig. 41, and

Fig. 43 is a fragmentary perspective view of a slightly modified cartridge.

Illustrative of the embodiments disclosed, the pneumatic tacker is generally designated PT and comprises a hollow substantially cylindrical casting C, a swingable base or case CC, and a housing HS secured to casting or casing C and pivotally holding base CC. Housing HS is characterized by the U-shaped sheath S having welded thereto the channel shaped member CH to form guideway FG for the staple element forming blade or former F and the staple driving blade DB (Fig. 3) which is slidably guided between the inwardly turned ends or ears EF of former F (Fig. 28), and between the posterior surfaces PS of the former F and the front surfaces FS of web W of the fixed channel member CH to form a raceway or gap RW adapted to closely receive an inverted U-shaped staple SP, that is, after having been formed its rectilinear wire element E. Forming blade F (Fig. 3) is secured by rivets 10 to extension 11 depending from hollow substantially cylindrical staple forming piston FP slidably guided by bore B of cylinder or casing C.

Rivets 12 anchor driving blade DB to depending extension 13 of the substantially cylindrical staple driving piston SDP slidably guided in the substantially cylindrical cup shaped forming piston FP. Forming a part of driving piston SDP is the fixed rubber sealing cup 28. Forming piston FP and the staple driving piston SDP for purposes of description may be considered as a compound piston controlled by a pivoted finger operable trigger T adapted to actuate plunger 14 of the valve generally designated V. Plunger 14 is slidably guided in bore 15 of the insert 16 interrupted by ports 17 and 18 respectively. Rod 19 is secured to plunger 14 and fixedly carries the upper poppet member 20 adapted to open or close port 21 (Fig. 5). Plunger 14 and poppet member 20 together with rod 19 may be considered as the valve stem which is self closing, that is, it closes by air pressure on poppet member 20 after finger pressure is removed from the trigger T. Consequently poppet member 20 is normally against seat 22 (Fig. 3) preventing admission of compressed air into bore B from the intake chamber 23 of handle H which integrally is merged with cylindrical casing C. Also at this time plunger 14 has been forced away by air pressure from outlet or exhaust ports 18 and therefore the latter are in communication with the outlet exhaust chamber 24 of handle H which embodies baffle 25 effectively separating the air intake chamber 23 from the air exhaust chamber 24. It follows that normally intake port 21 is closed and the exhaust ports 18 are open.

Effectively held by the removable cap 26 for casing or cylinder C is the stem 27 which appropriately carries the frustro conical rubber sealing cup 28 which is held in set position relative to cylinder C and which is adapted to be received by cylindrical bore 29 of the staple forming piston FP. Concerning housing HS, specifically sheath S thereof is U-shaped having its front wall 30 (Figs. 1, 2, 28 and 37) indented to define web 31, which at its lower part is interrupted by the spaced slots 32 for receiving the spaced cam shaped lips L at the forward ends of the spaced sides 33 of the slidably guided U-shaped staple element bending block BB which is slidably guided between the spaced sides 34 of the staple element strip support broadly designated BS fitting between and appropriately welded to the spaced sides 35 of the U-shaped shoe or carrier CR.

With staple element strip support BS between and welded to the spaced sides 35 of the carrier CR and the slidable bending block BB arranged between the spaced sides 34 of the latter, latch LT (Fig. 34) is inserted into the substantially horizontally alined slots 36, 37 and 38 in the spaced sides 35 of the carrier CR, the spaced sides 34 of the strip support BS and the spaced sides 33 of the slidable bending block BB. Also note Figs. 10 and 11.

Thereafter metal latch locating block 39 is positioned so that its non circular opening 40 receives middle lug 41 of latch LT to be confined with play between spaced sides 33 (Fig. 34) of the bending block BB, thus locating the latch against withdrawal, although permitting slight lateral displacement of the latch.

Surrounding lug 41 (Fig. 12) of latch LT and abutting block 39 is the helicoidal spring 42 having its outer end encircling projection 43 extending forwardly from the fixed block or stop 44 which includes projection 45 (Figs. 25 and 29) arranged in opening 46 in the bottom wall of carrier CR. Block 44 is held by latch spring 42 against the rear wall of opening 46 (Figs. 5 and 30) and against fulcrum pin 47 fixedly retained in the alined and spaced perforations of ears 48 and 49 of the spaced arms 50 extending from sheath S and the depending sides 51 of the keeper K. It will be observed that sides 51 of keeper K are interconnected by a bridge 52 constituting a seat for the split staple element belt cartridge or container generally denoted SBC. It will also be observed that block 44 is held against upward displacement by the rear ledges 34A overhanging the spaced sides 34 of the staple element support BS, that is, these ledges act on the upper part of block 44 to hold the lower shoulders 44H thereof against the bottom wall 98 of the carrier or guide CR.

Helicoidal spring 42 acts to normally urge the forwardly projecting limbs 53 of latch LT against alined front faces of the longitudinally arranged slots 36 and 37 of the carrier CR and staple element strip support BS, respectively. Attention, however, is directed to the fact that the laterally extending lobes 54 of latch LT are slightly tapered and overhang the spaced sides 35 (Figs. 26 and 34) of the carrier CR and are adapted to ride onto upwardly and forwardly inclined faces 55 of the alined notches N interrupting the forward parts of the spaced sides 51 of keeper K. These notches N also communicate with alined relief recesses 56. Stated in another way, the forward parts of spaced sides 51 of the keeper K characterize hook shaped portions of noses 57 adapted to removably interlock with the laterally extending lobes 54 of the slidably guided latch LT which has its limbs 53 abutting the front end faces of slots 36 and 37 of carrier CR and staple element strip support BS, in the event lobes 54 are out of the alined notches N and their respective communicating recesses 56 (Fig. 8), that is, when the base CC is unlocked from housing HS.

Where, however, the tapered lobes 54 are interlocked with the walls of notches N, limbs 53 of the latch LT are slightly spaced from the front end walls of the alined slots 36 and 37 and even from the front end wall of the alined notches N of the keeper as clearly shown in Fig. 11.

Attention is now directed to the elastic, flexible and foldable staple element belt SE adapted to be closely wound upon itself in the form of roll R (Fig. 19). Broadly speaking, this belt consists of rectilinear and juxtapositioned elements of suitable steel wire resiliently connected by the elastic coating 60 (Fig. 19A) reinforced if desired by the relatively thin and elastic transparent film or tape TP. Roll R is positioned within a split container or cartridge SBC, preferably of a suitable plastic material and if desired transparent. As illustrated cartridge SBC (Figs. 3, 20 and 38) comprises complementary parts generally indicated 61 and 62 having annular rims 63 and 64 each interrupted at their lower parts by a gap or throat as 65 (Figs. 3, 4 and 20) communicating with slots 66 and 67 defined by staple element guide rails 68 and 69 of the spaced wings 70 and 71 (Fig. 20). More specifically, rails 68 and 69 may be considered as constituted by spaced upper and lower parallel walls 72 and 73, the upper walls also merging with its associated annular rim as is well understood. Integral with complements 61 and 62 are as ears or arms 74 each having an overhanging fulcrum pin or post 76. Rims 63 and 64 have their inner margins appropriately rabbeted to provide reduced and interfitting portions 75 and 75' (Figs. 10, 14, 20 and 37) adapted to be glued together after insertion of the staple element roll R.

Also integral with complementary parts 61 and 62 of the staple element cartridge SBC are the laterally extending rearwardly inclined fins or ribs FN having front flat faces 77 adapted to abut the stop faces 78 of the upstanding and spaced wings or extensions 79 integral with but outwardly offset from the spaced sides or arms 50 of sheath S.

Fulcrum posts 76 of the disposal cartridge swingably carry a pair of pawls P each having an arm 80 merged at its lower end with a laterally arranged extension 81 each provided with a forwardly projecting finger 82 embodying at its forward end a rounded staple element gripping tooth or projection 83. Fingers 82 each include a rearwardly flared portion characterized also by downwardly and rearwardly extending cam face 84.

Each arm 80 of the pawls is provided with an inwardly turned and bent flange 85 having spaced studs 86 (Fig. 20) against which the anterior spaced legs 87 of the leaf spring generally indicated 88 is appropriately welded in which case studs 86 will melt into its respective spring legs and associated leg support. This spring 88 is bent intermediate legs 87 to form a loop LL (Fig. 22) and has its rear portion 89 which includes bridge 90 interconnecting legs 87 which are adapted to abut the removable cartridge SBC. However it should be observed that arms 80 of the pawls P each embody an elongated slot 91 fitting over a fulcrum post 76 of the complementary parts 61 and 62 of the cartridge. With legs 87 of spring 88 welded to bent flanges 85 of the pawls P and the latter arranged on posts 16 and with the rear part 89 of spring 88 abutting the complementary circular rims of the cartridge SBC (Fig. 38), the pawls P, that is, the arms 80 thereof are prevented from accidental removal from posts 76 in that legs 87 of spring 88 closely straddle flanges 80. By the construction disclosed pawls P have a loose slidable and swingable connection with the cartridge and additionally are effectively retained thereon. It is evident therefore that pawls P may be pivoted and slidably displaced relative to the cartridge SBC. Normally legs 87 of the U-shaped and bent spring 88 slope downwardly and forwardly following the direction of the contour of flange 85 of the pawls P. Of importance it should be realized that legs 87 are reduced at their lower ends to characterize terminal fingers 92.

These fingers 92 of spring 88 characterize means in association with teeth or convexed projections 83 of the pawls P to grip staple strip SE and shift the latter forwardly, that is, towards raceway RW after a complete cycle of the compound piston, that is, upon complete return stroke of the forming and driving blades F and DB, namely, to their normally raised position illustrated in Fig. 3.

The staple element strip SE issuing from the staple element belt R is gripped against rearward shifting by the tiltable and normally biased braking block GB (Fig. 5, 6, 20, 26, 31 and 37) which comprises reduced portion 93 (Fig. 31) loosely disposed in slot 94 in bottom wall 95 of U-shaped bending block BB. Depending from reduced portion 93 is the projection 96 which is loosely disposed in opening 97 in the bottom wall 98 of the U shaped carrier or carriage CR, the arrangement being such that shoulders 99 are tiltable or rockable relative to bottom wall 98 of carrier CR. It is also apparent that sheath S has its lower part offset or reduced with respect to its upper part, to wit, its spaced arms 50 are a distance apart greater than the distance between its spaced extensions 79 although interconnected by the curved shoulders 100, thus providing spaced compartments CM (Fig. 31) for convenient reception of the spaced rails or guides 68 and 69 of the split cartridge SBC.

Brake or grab pawl GB embodies at its upper part the spaced fingers 101 (Figs. 31 and 37) for coacting with the lower faces of the staple element strip SE slidably disposed within the slotted rails or arms 68 and 69 of the cartridge components 61 and 62. An intermediate reduced part or tongue 93' (Figs. 18, 20 and 31) of bridge 93 of the staple strip support BS is straddled by the spaced fingers 101 and received within recess 102 at the upper part of pawl GB. Also fingers 101 movably fit into the spaced and alined notches 103 interrupting bridge or staple element seat 93. Even the rear and uppermost corners 101' (Fig. 23) extends slightly above the upper surface of seat 93 when the base CC is unlocked and swung downwardly out of the keeper K and sheath S (Figs. 8 and 21), sheath S constituting the housing HS for the swingable base CC.

Gripping pawl or staple element brake GB and the rear upstanding lug 104 of bending block BB are appropriately interconnected by helicoidal spring 105. Specifically the front end or eye 106 of this spring 105 is retained on lug or hook 107 extending from pawl GB while its rear eye 108 is held on lug 104. This spring 105 has a double function, namely, one, to normally urge the pivoted pawl PG rearwardly, and two, to urge the staple element bending block BB in a forward direction to present the spaced lips L of the spaced sides 33 through the spaced gaps 32 of web 31, and of course at a time when both the staple former F and the driving blade BB are above these lips L (Fig. 3) at which time the front end of the bottom wall 95 of bending block BB abuts web 31 of the indented wall 30 thus limiting further forward movement of block BB. Thus if the compound piston is in its normally raised position and awaiting finger manipulation of pivoted trigger T, lips or cams L extend through the vertical former guideway FG and even project outside of sheath S. Lips L continue to project across guideway FG on the down stroke of the former F until ends EN (Fig. 28) of the foremost element E of the staple strip SE are bent against the outside side walls 200 of the spaced anvil heads AH to form the inverted U-shaped staple SP. After the latter is completely formed and with its depending legs straddling the anvil heads AH, the front wall of the former F (Fig. 6) meets lips L causing the bending block BB to recede or slidably shift rearwardly against the resistance of spring 105.

When base CC is swung into the fixed keeper K carried by sheath S, seat 52 for supporting cartridge SBC is positioned on spaced and alined lugs 114 and against alined vertical shoulder 115 of the spaced sides 35 of carrier CR. Projections or anvil heads AH of spaced sides 33 of the slidable bending block BB movably extend into relief gaps 118 (Figs. 9, 17, 18 and 20) interrupting the front end FE of bridge 93 of the staple element support 93.

Concerning the staple element bending or shaping anvil block BB, it will be noted that the spaced side walls 33 carry fixed pin 110 which has its ends projecting into the alined elongated slots 111 near the front end of the spaced sides 34 to permit the anvil block BB to slide lengthwise relative to support BS and carrier CR. The ends of this pin 110 also extend beyond the overhanging spaced side walls 34 of the staple strip support BS and into alined relief recess 117 interrupting spaced sides 35 of carrier CR.

On the down stroke of the forming blade F, spaced lips L are cammed to cause bending block BB to slide rearwardly relative to the carrier CR. If the bending block BB is moved rearwardly, helicoidal spring 105 is extended, consequently, braking the tiltable pawl GB (Figs. 22 and 24) which is also urged slightly rearwardly and positively grips the staple element strip SE against the downwardly and forwardly disposed platen 112 (Fig. 5) which is integral with and extends rearwardly from web W (Figs. 5 and 28) of channeled shaped member CH welded to the front wall 30 of the sheath S. In fact platen 112 together with staple element strip seat 93 constitutes a forwardly and downwardly inclined channel 113 for directing the staple element strip SE towards guideway FG formed in part by the indented front wall 30 of sheath S and channel shaped member CH, and, also by wall 30 of sheath S and by front walls 140 of spaced sides 34 of support BS.

Platen 112 together with the spaced support 93 characterizing channel 113 and may be said to constitute a chute for the staple element strip SE, that is, in directing the latter towards and the foremost staple element thereof into raceway RW and under former F. More particularly, this channel 113 together with the guide slots 66 and 67 of the guide rails 68 and 69 of the staple element container or cartridge SBC direct the staple element strip towards the front raceway RW.

Referring to Figs. 13 and 35 and to the cylindrical casting C, the latter embodies the reduced portion 115′ having flat side 116 straddled by extensions 79 of sheath S removably secured to this reduced portion or boss 115′ by screws 117. Integral with and depending from reduced portion 115′ is the channel shaped bearing 118 having laterally extending flanges 119 (Figs. 32 and 33) contiguous to web W of the channel shaped member CH welded to sheath S.

Integral with and extending rearwardly from reduced portion or boss 115′ of the cylindrical casting C are the spaced lugs 130 fixedly carrying the hollow fulcrum pin 131 (Fig. 6) about which is the rotatable loop 132 to which the upper end of retaining leaf spring strap ST is anchored by rivets 133. Incidentally loop 132 is desirably loosely disposed about pin 131 to permit strap ST to lie flat against the cartridge. This strap ST is utilized to hold staple element cartridge SBC on seat 52 and the inclined faces 77 of the inclined fins FN against the rear faces 78 of extensions 79 of sheath S at which time the staple element guide rails 68 and 69 (Fig. 15) extend deep into sheath S positioning the spaced spring controlled swingable feeding pawls P near the front end of the staple element strip SE, that is, near the foremost staple of this strip (Fig. 22). Also at this time the upper front part of the cartridge SBC is in the relief arcuate recess AR interrupting reduced boss 115′ of the casting (Figs. 1, 3 and 35). If strap ST be unhooked from the carriage CR, that is, from its rear perforated wall 136, this spring, due to its own resiliency flattens out as indicated by the dash and dot lines in Fig. 3. It follows that if the staple element belt be used up, it may be quickly replaced by a new cartridge, which can be promptly mounted on seat 52 to position fins FN thereof against stop faces 78 of sheath S, thereby arranging its spaced rails in spaced compartments CM and hence these rails or guides 68 and 69 widely straddle the staple element strip seat 93 and platen 112. Subsequently strap ST is swung to permit entry of lip or hook 134 into opening 135 to interlock with wall or bridge 136 of the outside carrier CR. This can only take place when base CC is unlatched from and swung out of the housing. Thereafter base CC is swung to its closed position to permit latch LT to interlock with keeper K. By this action strap ST becomes tightly wrapped about the cartridge with fins FN firmly against stop faces 78. By positioning the cartridge within housing HS, that is, on seat 52, stop faces 78 cooperating with fins FN limit forward displacement of the cartridge; outside and spaced surfaces 301 (Figs. 20, 37 and 38) of the rear part of arms 74 cooperate with the inside faces of the spaced extensions or wings 79 of sheath S to limit lateral displacement of the cartridge while the taut strap ST after interlocking with bridge 136 and after fully closing of the swingable base CC, holds the cartridge against rearward displacement, and consequently in its located and set position on seat 52, at which time extensions 81 of pawls P yieldingly abut front projections or lugs 81A of keeper K (Figs. 8, 20 and 26) to position pawls P in the machine and limit forward displacement thereof.

Strap ST will disengage from the cartridge automatically when latch LT is shifted rearwardly to unlock from keeper K and if thereafter base CC is swung out fully from the housing HS in which instance access may be had to the parts forming guideway FG and raceway RW formed by sheath S and base CC.

More specifically, fulcrum pin 47 goes through the perforated ears 48 and 49 of sheath S and keeper K. This pin also goes through spaced and perforated ears 137 at the rear part of carrier CR. Fulcrum pin 47 is effectively retained set by snap C rings as 138. By this arrangement, the base CC (Fig. 21) which comprises staple element strip support BS, the slidable bending block BB, slidable latch LT, braking pawl GB and other operating parts associated with the carrier CR, may be swung into or out of the housing HS defined by sheath S and its inside fixed keeper K. In Fig. 21, base CC is illustrated as unlocked from housing HS and almost fully swung out of the latter. By such action, hook 134 is about ready to automatically detach from bridge 136. On further rearward swingable displacement of base CC, hook 134 does in fact automatically disengage from bridge 136 and immediately assumes the straight and flat position as previously referred to and as illustrated in the dash and dot lines in Fig. 3. The cartridge is thus free to be removed from the housing, and more specifically from seat 52 of keeper K and of course from between the spaced extensions 79 of sheath S. Manifestly the spaced and pivoted staple element feeding pawls P since they are permanently associated with cartridge SBC in the embodiment shown in Figs. 1-38, likewise are withdrawn from between extensions 79. In other words, the cartridge SBC which carries the feeding pawls P, may be withdrawn, discarded and replaced by a fully loaded cartridge which likewise carries its own pair of staple element feeding pawls.

When base CC is unlocked and swung out of housing HS, pin 110 which overhangs sides 34 of the staple belt supporting member BS is at the forward ends of the alined slots 111 of the spaced sides 34 of the staple strip support BS due to the action of helicoidal spring 105 which always tends to urge bending block BB forwardly (Fig. 8) whereby anvil or shaping heads AH of this bending or shaping block extend beyond the forward end FE of tongue or seat 93 (Fig. 9). Or stated in another way, the anvil heads AH, extend beyond the inclined but alined guide faces 140 of the spaced sides 34 at the front ends of the staple element support BS whose sides 34 terminating in spaced feet 141 receivably in positioning and spaced notches 142 (Fig. 20) interrupting carrier CR. In other words, feet 141 straddle tongue 143 at the front part of bottom wall 144 of the U-shaped carrier CR.

Also when base CC is unlocked and swung out of housing HS, lobes 54 of latch LT are at their most forward position relative to alined slots 36 of the spaced sides 35 of carrier CR due to the action of spring 42 which always has the tendency to urge block 39 forwardly and since block 39 abuts web 145 of latch LT, the slightly tapered lobes 54 of legs 53 abut the forward ends of slots 36. However, after the housing HS has been loaded with a new cartridge SBC, and base CC is swung towards the housing HS, lips 54 meet and contact the spaced inclined cams 57 of keeper K thereby causing bodily rearward displacement of latch LT until these lips 54 reach and pass over the apices of the spaced cams 57. Thereafter spring 42 automatically shifts latch LT forwardly to ride along cam faces 55 and into notches N, stopping just short of the forward end faces of alined slots 36 and 37 (Fig. 11) at which time intermediate portions 146 interconnecting web 145 and outside wings 147 of latch LT are disposed within the alined clearing recesses 148 and 149 in the spaced sides 50 of sheath S and spaced sides 51 of the keeper K respectively at which time outside wings 147 and the spaced actuating lugs 150 of latch LT straddle the secured ears 48 and 49 of the housing HS, that is, the sheath S and keeper K thereof at the rear part of the housing, while as front part of the housing, sides 50 and 51 of sheath S and its secured keeper K are arranged in notches 151 defined by wings 147 and spaced limbs 53.

According to the invention latch LT has adequate play or clearance 400 (Fig. 34) between the locating block 39 and the spaced sides 33 of the U-shaped bending block BB. This play permits rotational displacement of latch LT relative to housing HS. Advantage is taken of this rotational displacement to permit latch LT to properly aline itself at the completion of its locking engagement with keeper K, that is, with walls of notches N. For example, in actual practice, cam faces 55 of notches N of keeper K may not be at the same elevation. Hence one of the lobes 54 of latch LT would completely be in its home position in advance of its companion but opposite lobe 54 which at this time should cooperate with the other side of the keeper but because of differential manufacturing tolerances is not in its complete home position. In such case, spring 42 acting on locating block 39, automatically causes the block to compensate for such differential tolerance, and thus rotates slightly, thereby causing the latch to correspondingly rotate whereby the lobe 54 of latch LT, previously not in its complete home position, to effectively rotate into such position and of course automatically. In other words, latch LT is self alining to permit both of its lobes to completely and effectively interlock with the walls of respective notches N even though the lower and spaced cam surfaces 55 thereof may be at different elevations due to involuntary tolerances occurring in actual practice.

To open housing HS, the tapered wings 147 are grasped by the operator and shifted rearwardly. This action compresses spring 42 and eventually the spaced actuating lugs 150 of latch LT, strike the rear ends 152 (Figs. 11 and 12) of the alined slots 38 in the spaced sides 33 of bending block BB. Consequently this U-shaped bending block is slidably guided rearwardly and to a position where lobes 54 of legs 53 of latch LT are out of alined notches N, that is, free of the apices of cams 57 and are arranged in clearing recess 56, thus unlocking latch LT from keeper K, permitting base CC to be swung downwardly and rearwardly out of the keeper K to automatically unlock strap ST from carrier CR whereby the staple element cartridge SBC may be withdrawn from the housing HS and replaced if desired.

Specially referring to Figs. 20, 29, 30 and 30A, it will be noted that the spaced sides 33 of bending block BB are provided with notches as 44A to characterize reduced portions 44B slidably receivable in vertical gaps 44C (Figs. 29, 30 and 30A) defined by the inner faces 44D of the spaced sides 34 and the spaced side faces 44E of the fixed block 44 wherein shoulders 44F (Fig. 29) are spaced from bottom wall 98 of carrier CR to also slidably guide the reciprocable bending block BB. By this arrangement the rear parts 44B of the bending block BB movably project into relief gaps 44C on the down stroke of the former F and also on the down stroke of the driving blade DB but slide out of the gaps 44C upon completion of the return stroke of both the former and driving blades.

Attention is again called to the fact that guideway FG is formed at its upper part by web 31 of sheath S and web W of the channel shaped member CH (Figs. 3, 28 and 33) and at its lower part by web 31 of sheath S and by the spaced faces 140 of the staple element support BS. In the assembled relation of housing HS and cylinder C, flanges 119 of bearing 118 are against web W (Fig. 33) while the tapered and externally convex terminal 500 of cylinder C is against the front wall 30 of sheath S. In other words, terminal 500 together with depending bearing 118 define a gap 501 (Figs. 3, 32 and 35) for closely receiving the upper part of housing HS characterized by sheath S and its secured channel shaped member CH. However the cylinder C is provided between shoulder 156 and inner upper face 503 (Fig. 3) of terminal 500 with relief slot 502 (Figs. 3, 5 and 32) to preclude interference with the former and driving blades F and DB during displacement thereof.

Due to manufacturing tolerances slight misalinement may take place between sheath S and channel shaped member CH relative to bore B of cylinder C and in accordance with the invention herein disclosed, in the event uncontrollable tolerances exist causing such misalinement, the latter is compensated for by permitting the forming piston FP to tilt slightly without losing the effective seal thereof. To this end it will be observed that forming piston FP embodies the laterally extending circumferential rib 600 to which rubber ring 601 is appropriately fixed. This ring coacts to seal and pivotally bear against the cylindrical wall bore B. By such construction the forming piston and fortuitously the staple driving piston may rock or swing slightly relative to the cylinder in the event of misalinement between the wall of bore B in regard to the sheath S and web W which constitute the upper part of guideway FG and in regard to sheath S together with spaced faces 140 of the staple element support BS which constitute the lower part of track or guideway FG. It should be noted that rib 600 has external converging faces interrupted by a gap as illustrated for adequately retaining rubber ring 601.

Coming now to the staple element cartridge SBC (Figs. 15 and 20), the lower walls 72 and 73 of the staple element guide rails 68 and 69 are each provided with a notch 700 (Figs. 15, 20 and 37) and the lower walls embody effective interfitting rabbeted margins 75 and 75'. Consequently in the assembled relation of components 61 and 62 the latter defines recess 701 (Figs. 15 and 37) to clear platen 112 and staple element seat 93 as is well understood.

In Fig. 3, the pneumatic tacker PT is shown in a neutral position, that is, both the forming piston FP and staple driving piston SDP are fully elevated and thus both the forming blade F and the driving blade DB are slightly above the foremost straight staple element E, trigger T is held depressed by air pressure on poppet member 20, the intake port 22 is closed, the exhaust ports 18 are open, the staple element strip SE has been threaded through the slotted rails 68 and 69 and into the chute comprising the downwardly sloping platen 112 and the spaced staple element seat or support 93, and of course by the channeled or slotted rails 68 and 69 of cartridge SBC straddling platen 112 and seat 93 and while fins FN of the cartridge are held against sheath S by strap ST. It should be mentioned that forming piston FP is held normally raised by helicoidal spring 155 seated on annular shoulder 156 within lower part of cylinder C. This spring also abuts annular shoulder 157 at the lower part of the forming piston FP.

If the operator lifts trigger T, plunger 14 is raised (note Fig. 4), thus closing exhaust ports 18 concomitantly opening intake port 21. Consequently compressed air from chamber 23 flows through ports 17, into the intermediate duct 160 and around the upper end of and into and about the forming piston FP and against the rubber cup 28 carried by stem 27 to seal the latter against the inside cylindrical bore of forcing piston FP.

The forming piston therefore moves downwardly and therefore the former blade F moves against the foremost straight staple element E positioned across and on anvil heads AH of the bending block BB. At this phase of this specification attention is now particularly directed to Fig. 28 wherein only the foremost staple element is shown for purposes of clarity in respect to teaching the automatic control means for locating this foremost staple element, across the anvil heads AH now projecting into guideway or passageway FG. Previously it was specified that the channel shaped member CH which is desirably welded to sheath S in part defines means for guiding the staple former blade F and staple driving blade DB. Of course platen 112 of this channel shaped member CH also in part defines the downwardly and forwardly inclined chute or guide means for staple strip SE. In addition wings WW forwardly offset relative to web W of this channel shaped member CH serve as stop means for ends EN of the foremost staple element E to limit forward movement of this element at which time the latter is across and supported by the anvil heads AH although the intermediate portion of the element is in alinement with and across raceway RW and under the lowermost part of the inwardly turned ends EF of the former F. These ends EF operate to bend the ends of the foremost staple element against the outside side faces 200 (Figs. 20 and 28) of the anvil heads AH to form the inverted U-shaped staple SP (Fig. 27). This action of the former F takes place on the first part of the down stroke of former piston FP and almost instantly after the trigger T is actuated. On the continuation of the downward stroke of the forming blade or former F the latter meets lips L, causing the bending block or anvil means BB to slide rearwardly. This action stretches spring 105 which causes the gripping block GB to tilt slightly rearwardly as indicated by the dotted lines in Fig. 22 causing corner 101' (Fig. 24) of the spaced fingers 101 to grip and dig against and even slightly tilt a staple element E' of the staple strip SE, causing the latter to be pressed against the upper face 113 of platen 112, thus preventing this belt from backing up or shifting rearwardly away from guideway or passageway FG. On the same down stroke of the former but after staple element E has been bent into the inverted U-shaped staple SP another important function takes place apart from braking the staple element strip SE, that is, former F meets the cams or lips L of the bending block BB. Therefore as previously stated the bending block is slidably and rearwardly displaced and consequently the fixed pin 110 bodily carried by the bending block is correspondingly shifted rearwardly. If block BB is shifted by former F, the anvil heads AH start to recede into spaced relief slots 118, that is, move rearwardly in a direction away from the formed staple now in guideway FG and on the down stroke of the driving blade DB, anvil heads AH completely clear raceway RW in a manner hereinafter more specifically discussed.

It has been stated pin 110 bodily moves rearwardly with the bending block or anvil member BB. Eventually the former blade F moves further downwardly carrying with it the formed staple SP and the ends of pin 110 meet the alined cam faces 84 of pawls P, causing these pawls P to swing rearwardly and slightly upwardly by reason of the loose but pivoted connections defined by posts 76 of the forwardly projecting spaced arms 74 on cartridge components 61 and 62, and the elongated slots 91 on pawls P as indicated by the broken lines in Fig. 22. Spring fingers 92 of arms 87 of the U-shaped spring 88 thus release their grip on the staple strip SE on the down stroke of former F.

On this down stroke of former F, the formed staple SP meets lips L which have their forward portions still traversing staple raceway RW (Fig. 5) but at a time when pin 110 is almost at the rear part of slots 111. At this time although staple element feed pawls P have released their grip on the staple element belt SE, the formed staple is held by lips L within the former and against alined and spaced faces 140 of the staple element support BS. But now the former F has completed its full down stroke and consequently spring 155 is almost fully compressed and bears against annular thimble TH surrounding spring 155. In turn, thimble TH compresses the superimposed rubber buffer rings BF which absorb the shock imparted by the forming piston and later by the driving piston and which have a snug fit with the wall of bore B, the lowermost ring BF being retained on annular shoulder 201. It has been assumed that where the former F meets the foremost staple element E still resiliently connected to the staple strip SE, this foremost staple element after its ends EN are bent against faces 200 of lips L by ears or ends EF of the former F, the staple thus formed will be severed by the former from the staple element strip and will be frictionally retained within the former and against the side faces 201 of bent ears EF (Fig. 28) and consequently this formed staple will move bodily downwardly with the former up to its meeting with the spaced cams or lips L at the lower part or the raceway RW (Fig. 5). This condition arises only when the friction between side faces 201 of bent in ears or ends EF and the depending legs of the staple is large enough to cause the formed staple to move bodily with the former in which case the bent staple is severed from the elastic staple element strip SE. In actual practice this generally happens. In instances where the friction between the formed staple and the former is insufficient, the staple formed against the anvil heads would still be resiliently connected to the staple element strip and would hang in the raceway RW after recession of rearward displacement of the anvil heads AH, awaiting the impact by the driving blade DB on its down stroke to sever the now formed staple from the staple element strip SE. This condition likewise often occurs in actual use.

Up to this phase of the cycle of operation, the former F has completed its full down stroke (Fig. 5), the staple has been formed from the previously foremost staple element E, the staple element feeding pawls P have been rearwardly and upwardly displaced, thus emerging spring arms 87 of spring 88, spring fingers 92 have released their hold on the staple element strip SE, trigger T is still elevated, the staple driving piston SDP also is fully elevated, but towards the end of the down stroke of the former piston FP, the latter FP has passed downwardly and away from the frusto conical rubber sealing cup 28 carried by stem 27 of cup 26 of casting or cylinder C. It follows that compressed air under maximum predetermined pressure enters annular port 203 formed by the gap between sealing cup 26 and former piston FP and into the former piston FP, thus actuating driving piston SDP downwardly relative to the former piston FP. Hence driving blade DB moves downward in the blade guideway, that is, between posterior face PS of the former F and the forward face FS of web W (Fig. 28) and also between the side faces 201 defined by ears EF of the former. It may be well to mention at this point that blade guiding means RW is formed at its lower part by the front faces 140 of the spaced sides 34 of staple element support BS, the side faces 201 of ears EF of former F and the posterior surface PS of the former and consequently blade guideway RW also forms the staple raceway or staple guideway communicating with the staple element guide channel 113 for receiving the foremost element of the staple element strip SE.

Where the formed staple has been severed by the former it is supported by lips L across raceway RW (Fig. 6), and the downwardly moving blade DB meets the bridge of this staple. If the formed staple be still connected to the staple element strip, this formed staple would be severed from the strip by the driver blade DB. In either case, eventually the formed staple becomes seated against spaced lips L which are still across the staple raceway RW (note Fig. 6) before the complete down stroke of the staple driving blade DB. Suppose a pause is taken to analyze what has actually happened at this phase of the downward stroke of the driving blade DB in respect to the manner of supporting the driven staple towards the completion of the down stroke of blade DB. In this connection attention is directed to Figs. 5A and 5B, wherein the formed staple SP has its bridge 210 seated on spaced lips L and confined between posterior surface PS of former F and the spaced guide faces 140 of the spaced sides 34 of staple element support BS while the spaced legs 211 depending from bridge 210 are confined between sides end faces 201 of ears EF of the former, the outside faces 200 of lips L, spaced guide faces 140 of the staple element support BS and the posterior surface PS of former F at a time when bridge 210 is seated on lips L. In other words each of the depending legs of the formed and driven staple is stabilized against play even towards the completion of the down stroke of the driving blade, that is, prevented from buckling by five surfaces; PS, 201, 140, 200 and by a cam surface of its respective and associated lip L and on actual driving by still a sixth surface, namely, bottom surface 212 of the driving blade DB. It follows that the driven staple is supported all around its legs or shanks 211 against buckling, enhancing the penetration thereof into the material in which the formed staple is driven. Of course at the completion of the staple driving stroke by blade DB the formed staple is ejected from the tacker (Figs. 6 and 6A) at which time blade DB has displaced lips L clear out of raceway RW and the staple driving piston has compressed the rubber buffer ring 220 seated within forming piston FP which further compresses the superimposed buffer rings BF (Fig. 6).

At all times after the staple element is bent but during the down stroke of both the former F and driving blade DB, fingers 101 of brake pawl GB coact to prevent rearward displacement of the staple strip SE. Additionally the spring controlled pawls P have swung to the rearmost positions (Fig. 6), such movement being permitted in view of the rearwardly and downwardly inclined relief shoulders 260 (Figs. 1, 20 and 22) below and to the rear of fulcrum posts 76 on arms 74 of the cartridge SBC.

With the staple expelled, the operator removes finger pressure from the pivoted trigger T. Instantly the valve stem drops due to air pressure on poppet member 20. It follows that intake port 21 closes and exhaust ports 18 open, causing the air within the bore of the former piston FP and within bore B to flow into channel or duct 160 into ports 17 and bore 270 of insert 16, through exhaust ports 18, then into exhaust chamber 24 to the atmosphere, in other words air pressure in and around the former piston has been precipitously removed. By such action spring 155 recoils, that is, expands to elevate former piston FP to its normally or neutral position (Fig. 3). During retraction of the former piston, the staple driving piston SDP is raised likewise to its normal position and during such action lips LL are automatically projected across gap FG and slightly through the spaced openings 32 of front wall 30 of sheath S.

It is remembered that spring arms 87 (Figs. 4, 5, 6 and 22) were energized or placed under tension on the down stroke of the former blade F and blade DB and such spring arms 87 await the return or up stroke of both of these blades, at which time and more particularly when both the former F and the staple driving blade DB have gone beyond the elevation of channel 113 at which time spring arms 87 of spring 88 release their energy, sending feeding pawls P forwardly, hence causing the spaced spring fingers 92 to shift staple element belt SE forwardly in channel 113 to again present the foremost staple of strip SE over anvil heads AH and against stop wings W of the U-shaped channel shaped member CH, bearing in mind of course that by reason of the operating cycle above discussed the staple element belt wound up in the form of roll R has been depreciated by one staple element, namely, the discharged staple. Hence on each operating cycle, roll R loses one staple and as is well understood the roll unwinds to issue the staple strip SE from the secured cartridge or container SBC during operation of the tacker.

Attention is particularly directed at this time to Figs. 36 and 38. It will be observed that the cartridge SBC permanently, swingably and slidably carries the staple element strip feeding means in the form of spring controlled and spaced pawls P. If the cartridge be positioned on seat 52 with the spaced fins FN against faces 78 of sheath S, the upper curved parts of components 63 and 64 fit against the curved portion AR at the rear of the casting C at which time the upper spaced arms 74 which swingably and slidably carry pawls P straddle bearing 118 depending from the reduced portion 115' of the casting or cylinder C. Also the alined lower staple guide rails 68 and 69 which are integral with components 64 and 63 of the cartridge straddle staple element seat 93 and platen 112 (Figure 31). With pawls P swingably and slidably connected to upper arms 74, the rear intermediate parts 89 of U-shaped spring 88 bears yieldingly against the companion rims 63 and 64 of the cartridge, which action normally urges the swingable pawls P forwardly and against stop faces 280 on upper arms 74.

In accordance with the invention the lower margin LM of the front wall 30 of sheath S as well as proximal depending portions 300 of the spaced sides 50 thereof, extend downward to a level of the lower faces of spaced feet 141 of the support BS, thus defining a marginal shield or nose NZ (Fig. 24A) adapted to be received in a corner CN defined by supporting surface SS and vertical wall VW. It will be observed that the center lines of the forming and driving pistons, or that of the cylindrical casing C form an obtuse angle with the horizontal axial plane of the housing HS and even with the swingable base CC when closed and locked. By this construction the lower part of the housing HS and base CC defining the lower part of guide FG may be appropriately positioned in a corner as CN and the tacker PT effectively operated. Moreover, this lower part of the housing, that is, its nose NZ may be conveniently received in a groove when material is required to be fastened.

The tacker may be positioned on a horizontal supporting surface SS in which case the lower margin LM of the front wall 30 of sheath S together with feet 141, as well as the rear ears 48 and 49 of the housing HS and its fixed keeper are supported by such supporting surface. To facilitate gripping handle H, the latter is provided with a rubber jacket J.

On each down stroke of the compound piston, the bottom wall 98 of the carrier CR receives the impact transmitted from the anvil heads AH of the bending block BB (Figs. 26 and 34) causing spaced sides 35 of the carrier or guide to be urged in a downward direction as indicated by arrows in (Fig. 34). By such action, the shock absorbed from the carrier CR by latch LT is transmitted through the latch to keeper K, namely, to the inclined surfaces 55 of notches N in which lobes 54 of the latch are retained. Consequently lobes 54 are gripped more firmly by the walls of notches N and at the same time legs 53 of the latch are gripped more firmly the upper surfaces of slots 36 of the carrier CR, thus effectively preventing accidental unlocking of the latch LT during the time in forming of a staple and in driving the latter out of the tacker.

In the event the staple element strip SE of the staple element belt R be disposed on a bias relative to platen 112 (Fig. 16), the swingable pawls P, that is, the spring arms thereof after the return of the compound piston, operate automatically to compensate or correct this condition. Thus as shown in Fig. 16, the foremost staple E has one end thereof meeting the nearest stop wing WW while the other end of this element is spaced from the other wing WW of the channel shaped member CH. In other words foremost staple element E would not be properly alined under the former and driver blades or parallel to the raceway RW. However at the conclusion of the return stroke of the compound piston, one part of the staple element strip would first be urged by the leading pawl and more specifically by its spring finger 92 against the channel shape member CH and thereafter the spring finger 92 of the other pawl would retract and urge and rotate or twist the other side of the staple element strip now away from the channel member CH towards and against the latter, thus alining the foremost staple element parallel to and over the raceway RW and under both the staple forming and driving blades as desired.

Referring back to Fig. 3, it will be appreciated that intake chamber 23 of handle H is provided with a threaded tapered hole 800 adapted to be operatively connected to a hose (not shown) associated with a suitable compressed air source, as is well understood. This chamber is of a capacity to always contain a charge of compressed air after connecting the hose to the compressed air supply sufficient to operate the forming piston FP and subsequently the staple driving piston SDP on the same down stroke of the compound piston irrespective of the length of the hose, the involuntary reduction in cross sectional areas thereof due to kinks, or other causes restricting the normal flow of compressed air into the handle, thus insuring at all times maximum air pressure desired on the staple driving piston SDP regardless of the time required in actuating the trigger to start the flow of compressed air to operate the forming piston. By the expression "same down stroke of the compound piston" is meant, the down stroke of the forming piston FP and the down stroke of the driving piston DP. By the expression "staple element" is meant a piece of wire adapted to be formed into an inverted U-shaped staple. By the expression "staple element belt" is meant a series of juxtapositioned staple elements held by a common resilient bond to permit the belt to be flexed, folded, wound upon itself in the form of a compact roll or folded in any desired manner and adapted to be packed in a cartridge for loading into the tacker.

If the base be locked to the housing, latch LT may be drawn back completely against the resistance of spring 42 and thereafter promptly released. Shifting of the latch rearwardly causes the ends of pin 110 to actuate the spaced feed pawls P. But when the latch is released, the pawls automatically retract, causing the spaced spring fingers 92 to advance the staple element strip, that is, the front portion of the staple element belt against stops WW of the channel shaped member CH. Thus it is not necessary to open base CC to aline the foremost staple on to the anvil heads AH of the bending block or slidable anvil member BB. Thus the foremost staple is effectively presented to the raceway RW. However if base CC be swung open and closed thereafter, such closing action likewise due to the retraction of the latch LT automatically positions the foremost staple element to be supported across the anvil heads AH.

Previously it has been pointed out in connection with the embodiment according to Figs. 1–38 that the pawls P are permanently associated with the disposable cartridge SBC to provide for convenient loading or unloading of the tacker. However the invention herein disclosed, it should be understood, is not limited in this respect since these pawls may be permanently associated with the casting or casing C, as disclosed in connection with the modified embodiment illustrated in Figs. 39 to 43, wherein corresponding parts relating to form shown in Figs. 1–38 have been primed and wherein the swingable and slidable pawls P' are appropriately retained on fulcrum pin 900 effectively anchored in depending bearing 118'. Pawls P' of course straddle bearings 118' and are limited in the forward displacement by projections 81A' extending from keeper K. In the embodiment according to Figs. 39–43 it will be noted that arms 74 shown in Figs. 1–38 have been cut off, leaving merely lugs as 301' which are utilized to cooperate with the spaced sides 79' of sheath S to prevent lateral displacement of the disposable cartridge SBC' when mounted on the housing. In other aspects the form according to Figs. 39–43 is along the lines of the embodiment illustrated in Figs. 1–38.

It is well known that a tacker is one type of stapling machine and that tackers or stapling machines are also recognized as fastening machines. Consequently the disclosure herein, it should be understood, is not limited to tackers per se or to stapling machines per se.

Various changes may be made in the details of construction and arrangement of parts without departing from the scope of the invention or sacrificing any of the advantages thereof wherein therein.

I claim:

1. In a fastening machine, spaced means constituting a staple guideway, a cartridge for containing a staple element resilient belt comprising a series of juxtapositioned and resiliently secured staple elements, said cartridge having spaced rails removably disposed near said guideway for guiding a portion of said belt out of said cartridge to present the foremost element thereof to said guideway, movable means for forming said foremost element into a staple, reciprocable means in part guided by said movable means and defining in part with the latter a raceway for driving said formed staple out of said raceway, means actuated by said movable means for feeding said portion to again present the foremost element thereof to said guideway pursuant to discharge of said formed staple out of said raceway, and means removably securing said cartridge to hold the front parts of said rails near said guideway.

2. In a fastening machine, spaced means constituting a guideway, a cartridge for containing a foldable and resilient staple element belt comprising a series of juxtapositioned and resiliently secured substantially rectilinear staple elements, movable anvil means normally projecting in part into said guideway and slidably guided relative to said spaced means, said cartridge having spaced rails for guiding a portion of said belt out of said cartridge to present the foremost element thereof over said anvil means in said guideway, a reciprocable forming blade defining with a part of said spaced means a raceway and adapted to bend said foremost element over said anvil means to form a staple receivable in said raceway, and a reciprocable driving blade slidably guided in said raceway to force said formed staple therefrom while said forming blade is held depressed.

3. In a fastening machine, spaced means constituting a guideway, a cartridge for containing a foldable and resilient staple element belt comprising a series of juxtapositioned and resiliently secured substantially rectilinear staple elements, movable anvil means normally projecting in part into said guideway and slidably guided relative to said spaced means, means for guiding a portion of said belt out of said cartridge to present the foremost element thereof over said anvil means in said guideway, a forming blade defining with a part of said spaced means a raceway adapted to bend said foremost staple element over said anvil means to form a staple receivable in said raceway, a driving blade slidably guided by said forming blade and removably guided in said raceway to force said formed staple out of said raceway while said forming blade is held depressed, and means disengageably holding said cartridge to said housing.

4. In a fastening machine, spaced means constituting a guideway, a cartridge for containing a foldable and resilient staple element belt comprising a series of juxtapositioned and resiliently secured substantially rectilinear staple elements, movable anvil means normally projecting in part into said guideway and slidably guided relative to said spaced means, means for guiding a portion of said belt out of said cartridge to present the foremost element thereof over said anvil means in said guideway, a forming blade defining with a part of said spaced means a raceway, pneumatically controlled means for depressing said formin blade downwardly in said guideway and for bending said foremost staple element over said anvil means to form a staple receivable in said raceway and for maintaining said forming blade depressed in said guideway, a driving blade slidably guided removably in said raceway, and pneumatically controlled means for depressing said driving blade to force said formed staple out of said raceway while said forming blade is held depressed.

5. In a tacker, spaced means comprising a guideway adapted to receive a flexible and elastic staple element belt embodying a series of juxtapositioned staple elements secured to a common elastic bond to resiliently interconnect contiguous elements of said belt, movable anvil means in part normally extending across said guideway and having means for supporting the foremost element of said belt, a forming blade defining in part a raceway and slidably guided above and removably in said guideway and effective on the downward stroke thereof for bending said foremost element against the sides of said anvil means to form an inverted U-shaped staple to be received in said raceway and having means for shifting said anvil means rearwardly relative to said guideway and into said raceway prior to completion of said down stroke, means operable to maintain said forming blade depressed at the conclusion of said down stroke, a driving blade slidably guided in said raceway and having means for shifting the anvil means out of said raceway and for forcing said formed staple downwardly out of said raceway while said forming blade is still held fully depressed.

6. In a tacker, spaced means comprising a guideway, a cartridge containing a flexible and elastic staple element belt embodying a series of juxtapositioned and resiliently secured staple elements, movable anvil means in part normally extending across said guideway for receiving the foremost element of said belt and comprising cam means traversing said guideway, a forming blade defining in part a raceway and slidably guided in said guideway and effective on the downward stroke thereof for bending said foremost element against the sides of said anvil means to form an inverted U-shaped staple to be received in said raceway and having means cooperating with said cam means for shifting said anvil means rearwardly and out of said guideway and into said raceway prior to completion of said down stroke, means operable to maintain said forming blade depressed at the conclusion of said down stroke, a driving blade slidably guided in said forming blade and removably guided in said raceway and having means cooperating with said cam means for shifting the anvil means rearwardly out of said raceway and for forcing said formed staple downwardly out of said raceway while said forming blade is still held fully depressed.

7. In a fastening machine, spaced means constituting a guideway, a cartridge for containing a foldable and resilient staple element belt comprising a series of juxtapositioned and resiliently secured substantially rectilinear staple elements and said cartridge having spaced rails removably disposed near said guideway, movable anvil means normally projecting in part into said guideway and slidably guided relative to said base, means for said rails guiding a portion of said belt out of said cartridge to present the foremost element thereof over said anvil means in said guideway, a forming blade defining with said base a raceway, means operable for depressing said forming blade downwardly in said guideway and for bending said foremost staple element over said anvil means to form a staple receivable in said raceway and for maintaining said forming blade depressed in said guideway, a driving blade slidably and removably guided in said raceway to force said formed staple out of said raceway while said forming blade is depressed, and means for gripping said belt portion against slippage during bending of said foremost staple element in said guideway and during driving of said staple out of said raceway.

8. In a fastening machine, spaced means constituting a guideway, a cartridge for containing a staple element belt comprising a series of juxtapositioned and resiliently secured substantially rectilinear staple elements and said cartridge having spaced rails leading to said guideway, movable anvil means normally projecting in part into said guideway and slidably guided relative to said base, said rails having means for guiding a portion of said belt out of said cartridge to present the foremost element thereof over said anvil means in said guideway, a forming blade defining with said base a raceway, means operable for depressing said forming blade downwardly in said guideway and for bending said foremost staple element over said anvil means to form a staple receivable in said raceway and to maintain said forming blade depressed in said guideway, a driving blade slidably and removably guided in said raceway, means operable for depressing said driving blade to force said formed staple out of said raceway while said forming blade is depressed, means for gripping said belt portion during bending of said foremost staple element into a formed staple and during driving thereof out of said raceway, and means intermittently actuated by said forming blade for feeding said belt portion to said guideway pursuant discharge of said staples intermittently from said raceway.

9. A fastening machine for driving staples, comprising; spaced means defining a guideway, a support, a cartridge containing staple elements and seated on and outside of said support, said cartridge having spaced rails for guiding said staples successively to said guideway, and means removably holding said cartridge to said support and to maintain the front parts of said rails near said guideway.

10. A fastening machine for cooperation with a cartridge untilizing a flexible, foldable and resilient staple element belt having a series of juxtapositioned, relatively rectilinear and resiliently connected staple elements, comprising; a housing embodying a sheath having a front vertical wall constituting in part a guideway for reception of the foremost element of said belt and having spaced sides extending rearwardly of said wall, a guide member within said sheath and fixed relative to said wall and having a web spaced therefrom to define a passageway, directing means extending from and to the rear of said web, a seat carried by said housing to sustain said cartridge and disposed to the rear of said guide member, a base for opening or closing said housing and embodying a carrier, means movably holding said base to said housing, a support fixedly retained relative to said carrier and having a bridge constituting with said directive means a channel for guiding said belt to said guideway, stop means to limit displacement of the foremost staple of said belt into said guideway, keeper means, and means detachably interlocking with said keeper means to hold said base within said housing.

11. The fastening machine according to claim 10 wherein a bending block is slidably guided by said support and in part constitutes anvil means normally projecting forwardly beyond and into said guideway.

12. The fastening machine according to claim 11 further characterized in that said anvil means comprises spaced heads for supporting foremost staple when against said stop means and having alined substantially linear front portions and cam portions merging with and disposed below said linear front portions, and spring means reacting on said bending block to urge the latter forwardly to present said front portions forwardly into guideway and said cam portions across said guideway.

13. The fastening machine according to claim 11 wherein a movable trigger has a pivoted connection with said casing and constitutes means for actuating said valve stem for opening said intake port to permit compressed air in the bore of said cylinder to shift said forming piston downwardly and thereby said forming blade downwardly past said channel to bend said foremost staple against the sides of said anvil heads and thereby form a staple in said raceway, said forming blade on its down stroke after the formation of said staple coacting with said cams to shift said bending block rearwardly against the resistance of said spring means.

14. The fastening machine according to claim 13 wherein said bending block is provided with a fixed pin slidably guided by said support and having ends overhanging the latter.

15. The fastening machine according to claim 14 in that belt feeding means is pivotally and slidably disposed within said housing near said front wall and embodies means actuated by said pin on the downward displacement of forming blade to shift said belt feeding means rearwardly.

16. The fastening machine according to claim 15 wherein said sealing cup and forming cylinder characterize a valve adapted to be opened towards the completion of the downward stroke of said forming piston.

17. In a fastening machine, a pneumatic and hollow cylinder, a housing connected to said cylinder and embodying an open top forming piston slidably guided by the wall of the bore of said cylinder, a depending former blade carried by said forming piston, an open top driving piston nested within and slidably guided in said forming piston and adapted to be raised by the latter, a driving blade carried by said driving piston and guided by said forming blade, and a spring retained within said cylinder to normally hold said forming piston in its fully raised position for correspondingly elevating said driving piston to its fully raised position.

18. The fastening machine according to claim 17 wherein said cylinder embodies a handle having a compressed air intake chamber and an air exhaust chamber, a valve having an inlet port adapted to communicate with said intake chamber and having outlet ports communicating with said exhaust chamber, a valve stem normally closing said intake port and maintaining said exhaust ports in communication with said exhaust chamber, and a trigger for actuating valve stem to open said inlet port and concomitantly close said exhaust ports.

19. The fastening machine according to claim 18 wherein said forming piston has a bore, and a sealing cup is disposed within and yieldingly bears against the wall constituting the bore of said forming piston.

20. A tacker comprising; a housing having spaced sides, a base having slidable anvil means, said housing and base constituting means for guiding a staple element belt, means swingably holding the rear part of said base to the rear part of said housing to permit telescoping of said base within said housing to close the latter, spring controlled belt feeding means, braking means to permit or prevent displacement of said belt, and latch means for locking said base to said housing to prevent swingable displacement thereof out of said housing.

21. The tacker according to claim 20 wherein said housing embodies a keeper, and said latch is slidable and slightly rotatable relative to said base and is adapted to interlock with said keeper, and spring means cooperating to hold said latch disengageably interlocked with said keeper.

22. The tacker according to claim 21 wherein said latch has means for actuating said anvil means for operating said belt feeding means to advance said staple element belt forwardly upon manual release of said latch.

23. A tacker comprising a housing, a base pivoted to said housing, pneumatic means secured to said housing and having a compound piston comprising a forming piston, and a driving piston nested within said forming piston and guided thereby, the vertical axial plane of said pistons and housing defining an obtuse angle with the horizontal axial plane of said base.

24. A tacker comprising a base, a housing tilted relative to said base and secured thereto to define therewith an oblique angle, said base having depending feet, said housing having a depending lower margin spaced about said feet and defining a nose portion at the lower front part of said tacker adapted for positioning contiguous to corner walls.

25. A fastening machine adapted to utilize a flexible staple element belt having a series of substantially rectilinear and juxtapositioned wire elements independent of each other and resiliently connected to a common bond, comprising; a housing having a front wall constituting in part a staple element guideway adapted to receive the foremost wire element of said belt, a base carried by said housing, supporting means carried by said base to sustain the front end of said belt, belt feeding means movable relative to said supporting means and having grasping means movably straddling said belt, an anvil in part within said base and slidable relative to said supporting means and having at the upper part of its front end wire shaping means normally in part in advance of said supporting means and having at its lower part sloping means extending downwardly and forwardly away from said shaping means, spring means acting on said anvil for normally positioning said shaping means and sloping means into said guideway, a reciprocable forming blade normally above said shaping means but adapted on its downstroke to bend said foremost staple element against said shaping means to define a staple and having means effective on said downstroke and cooperating with said sloping means for urging said anvil rearwardly relative to said guideway against the resistance of said spring means to withdraw said shaping means from said guideway and having means in part constituting a raceway for reception of said staple, actuator means on said anvil and effective on rearward displacement of said anvil to rearwardly shift said feeding means idly over said belt, a reciprocable driving blade normally raised above said shaping means and substantially idle on the downstroke of said former blade but movably guided in said raceway on its downstroke while said forming blade is fully depressed for expelling said staple out of said raceway, means operable pursuant to expelling of said staple for elevating said blades above said shaping means, and means acting on said belt feeding means to cause said grasping means to bodily shift said belt forwardly to present the now foremost element thereof on said shaping means in said guideway.

26. A fastening machine adapted to utilize a flexible staple element belt having a series of substantially rectilinear and juxtapositioned wire elements independent of each other and resiliently connected to a common bond, comprising; a housing having a front wall constituting in part a staple element guideway adapted to receive the foremost wire element of said belt, a base carried by said housing, supporting means carried by said base to sustain the front end of said belt, belt feeding means movable relative to said supporting means and having grasping means movably straddling said belt, an anvil in part within said base and slidable relative to said support and having lip means and wire shaping means above but rearwardly of said lip means and normally in part in advance of said supporting means, spring means acting on said anvil for normally positioning said lip means and said shaping means into said guideway, a reciprocable forming blade normally above said shaping means but adapted on its downstroke to bend said foremost staple element against said shaping means to define a staple and having means effective on said downstroke and cooperating with said lip means for urging said anvil rearwardly relative to said guideway against the resistance of said spring means to withdraw said shaping means from said guideway and having means in part constituting a raceway for reception of said staple, actuator means on said anvil and effective on rearward displacement of said anvil to rearwardly shift said feeding means idly over said belt, a reciprocable driving blade normally raised above said shaping means and substantially idle on the downstroke of said former blade but movably guided in said raceway on its downstroke while said forming blade is fully depressed for expelling said staple out of said raceway, means carried by said housing and operable pursuant to expelling of said staple for elevating said blades above said shaping means, and resilient means acting on said belt feeding means to cause said grasping means to bodily shift said belt forwardly to present the now foremost element thereof on said shaping means in said guideway.

27. A fastening machine adapted to utilize a flexible staple element belt having a series of substantially rectilinear and juxtapositioned wire elements independent of each other and resiliently connected to a common bond, comprising; a housing having a front wall constituting in part a staple element guideway adapted to receive the foremost wire element of said belt, a base carried by said housing, supporting means carried by said base to sustain the front end of said belt, belt feeding means movable relative to said supporting means and having grasping means movably straddling said belt, an anvil in part within said base and slidable relative to said support and having at its front end spaced cams and spaced wire shaping heads above but rearwardly of said cams and normally in part in advance of said supporting means, spring means acting on said anvil for normally positioning said cams and said heads into said guideway, a reciprocable forming blade normally above said heads but adapted on its downstroke to bend said foremost staple element against said heads to define a staple and having means effective on said downstroke and cooperating with said cams for urging said anvil rearwardly relative to said guideway against the resistance of said spring means to withdraw said heads from said guideway and having means in part constituting a raceway for reception of said staple, actuator means on said anvil and effective on rearward displacement of said anvil to rearwardly shift said feeding means idly over said belt, a reciprocable driving blade normally raised above said shaping means and substantially idle on the downstroke of said former blade but movably guided in said raceway on its downstroke while said forming blade is fully depressed for expelling said staple out of said raceway, means carried by said housing and having movable means for depressing said former blade and for subsequently depressing said driving blade while said forming blade is substantially depressed, means operable pursuant to expelling of said staple for elevating said blades above said heads, and means acting on said belt feeding means to cause said grasping means to bodily shift said belt forwardly to present the now foremost element thereof on said heads in said guideway.

28. A fastening machine adapted to utilize a flexible staple element belt having a series of substantially rectilinear and juxtapositioned wire elements independent of each other and resiliently connected to a common bond, comprising; a housing having a front wall constituting in part a staple element guideway adapted to receive the foremost wire element of said belt, a base carried by said housing, supporting means carried by said base to sustain the front end of said belt, belt feeding means swingable and slidable relative to said supporting means and having grasping means movably straddling said belt, an anvil in part within said base and slidable relative to said support and having at its front end spaced cams and spaced wire shaping heads above but rearwardly of said cams and normally in part in advance of said supporting means, spring means acting on said anvil for normally positioning said cams and said anvil heads into said guideway, a reciprocable forming blade normally above said heads but adapted on its downstroke to bend said foremost staple element against said heads to define a staple and having means effective on said downstroke and cooperating with said cams for urging said anvil rearwardly relative to said guideway against the resistance of said spring means to withdraw said heads from said guideway and having means in part constituting a raceway for reception of said staple, actuator means extending from said anvil and effective on rearward displacement of said anvil by said forming blade to rearwardly shift said feeding means idly over said belt, a reciprocable driving blade normally raised above said shaping means and substantially idle on the downstroke of said former blade but movably guided in said raceway on its downstroke while said forming blade is fully depressed for expelling said staple out of said raceway, means carried by said housing and having movable means for depressing said former blade and thereafter depressing said driving blade while said former blade is depressed, means operable pursuant to expelling of said staple for elevating said blades above said heads, and spring means automatically acting on said belt feeding means pursuant to elevation of said blades above said heads to cause said grasping means to bodily shift said belt forwardly to present the now foremost element thereof on said heads.

29. A fastening machine adapted to utilize a flexible staple element belt having a series of substantially rectilinear and juxtapositioned wire elements independent of each other and resiliently connected to a common bond, comprising; a housing having a front wall constituting in part a staple element guideway adapted to receive the foremost wire element of said belt, a base carried by said housing, supporting means carried by said base to sustain the front end of said belt, belt feeding means swingable and slidable relative to said supporting means and having vertically spaced grasping means straddling spaced marginal portions of said belt and comprising spaced resilient terminal fingers for removably gripping the upper surface of said belt and comprising spaced pawls embodying spaced teeth for removably gripping the lower surface of said belt and including lower cam shaped portions, an anvil in part within said base and slidable relative to said support and having at its front end spaced cams and spaced wire shaping heads above but rearwardly of said cams and normally in part in advance of said supporting means, spring means acting on said anvil for normally positioning said cams and said anvil heads into said guideway, a reciprocable forming blade normally above said heads and having bent in ears adapted on the downward stroke of said forming blade to bend said foremost staple element against said heads to define a staple and having means effective on said downstroke and cooperating with said cam for urging said anvil rearwardly relative to said guideway against the resistance of said spring means to withdraw said heads from said guideway and having means in part constituting a raceway for reception of said staple, pin means extending from said anvil and cooperating with said cam shaped portions and effective on rearward displacement of said anvil by said former blade to rearwardly shift said pawls to displace the latter and said resilient terminal fingers idly over said belt, a reciprocable driving blade normally raised above said shaping means and substantially idle on the downstroke of said former blade but movably guided in said raceway on its downstroke while said forming blade is fully depressed for expelling said staple out of said raceway and cooperating with said cams to shift the latter out of said raceway, means carried by said housing and having means for depressing said former blade and thereafter depressing said driving blade while said former blade is depressed and having means operable pursuant to expelling of said staple for elevating said blades above said heads, and spring means integral with said terminal fingers and acting on said pawls to cause said terminal fingers and teeth to grasp and bodily shift said belt forwardly to present the now foremost element thereof on said heads subsequent to the elevation of said blades above said heads.

30. A fastening machine adapted to utilize a flexible staple element belt having a series of substantially rectilinear and juxtapositioned wire elements independent of each other and resiliently connected to a common bond, comprising; a housing having a front wall constituting in part a staple element guideway adapted to receive the foremost wire element of said belt, a base carried by said housing, supporting means carried by said base to sustain the front end of said belt, belt feeding means swingable and slidable relative to said supporting means and having vertically spaced grasping means straddling spaced marginal portions of said belt and comprising resilient terminal means for removably gripping the upper surface of said belt and having spaced pawls embodying spaced teeth for removably gripping the lower surface of said belt and including lower cam shaped portions, an anvil in part within said base and slidable relative to said support and having at its front end spaced cams and spaced wire shaping heads above but rearwardly of said cams and normally in part in advance of said supporting means, spring means acting on said anvil for normally positioning said cams and said anvil heads into said guideway, a reciprocable forming blade normally above said heads but adapted on its downstroke to bend said foremost staple element against said heads to define a staple and having means effective on said downstroke and cooperating with said cams for urging said anvil rearwardly relative to said guideway against the resistance of said spring means to withdraw said heads from said guideway and having means in part constituting a raceway for reception of said staple, actuator means on said anvil cooperating with said cam shaped portions and effective on rearward displacement of said anvil by said former blade to rearwardly shift said pawls to displace the latter and said terminal means idly over said belt, a reciprocable driving blade normally raised above said shaping means and idle on the downstroke of said former blade but movably guided in said raceway on its downstroke while said forming blade is fully depressed for expelling said staple out of said raceway, means carried by said housing for depressing said former blade and thereafter depressing said driving blade while said former blade is depressed and having means operable pursuant to expelling of said staple for elevating said blades above said heads, and spring means acting on said pawls to cause said terminal means and teeth to grasp and shift said belt bodily forwardly to present the now foremost element thereof on said heads.

31. A fastening machine adapted to utilize a flexible staple element belt having a series of substantially rectilinear and juxtapositioned wire elements independent of each other and resiliently connected to a bond common to said elements, comprising; a housing having a front wall constituting in part a staple element guideway adapted to receive the foremost wire element of said belt, a base carried by said housing, supporting means carried by said base to sustain the front end of said belt, belt feeding means swingable and slidable relative to said supporting means and having vertically spaced grasping means comprising terminal means for removably gripping the upper surface of said belt and having spaced pawls for removably gripping the lower surface of said belt, an anvil in part within said base and slidable relative to said support and having at its front end spaced cams and spaced wire shaping heads above but rearwardly of said cams and normally in part in advance of said supporting means, spring means acting on said anvil for normally positioning said cams and said anvil heads into said guideway, a reciprocable forming blade normally above said heads but adapted on its downstroke to bend said foremost staple element against said heads to define a staple and to sever the latter from said bond and having means effective on said downstroke and cooperating with said cams for urging said anvil rearwardly relative to said guideway against the resistance of said spring means to withdraw said heads from said guideway and having means in part constituting a raceway for reception of said staple, actuator means on said anvil and effective on rearward displacement of said anvil by said former blade to rearwardly shift said belt feeding means to displace said pawls and said terminal means idly and together by said belt, a reciprocable driving blade normally raised above said shaping means and idle on the downstroke of said former blade but movably guided in said raceway on its downstroke while said forming blade is fully depressed for expelling said staple out of said raceway, means carried by said housing for depressing said former blade and thereafter depressing said driving blade while said former blade is depressed and having means operable pursuant to expelling of said staple for elevating said blades above said heads, spring means acting on said belt feeding means to cause said terminal means and pawls to grasp and shift said belt forwardly to present the now foremost element thereof on said heads, and braking means to prevent displacement of said belt relative to said support during said rearward shifting of said pawls.

32. A fastening machine adapted to utilize a flexible staple element belt having a series of substantially rectilinear and juxtapositioned wire elements independent of each other and resiliently connected to a common bond, comprising: a housing having a front wall constituting in part a staple element guideway adapted to receive the foremost wire element of said belt and said wall having spaced openings, a base carried by said housing, supporting means carried by said base to sustain the front end of said belt, belt feeding means swingable and slidable relative to said supporting means and having vertically spaced grasping means comprising terminal means for removably gripping the upper surface of said belt and having spaced pawls embodying spaced teeth for removably gripping the lower surface of said belt, an anvil in part within said base and slidable relative to said support and having at its front end spaced cams and spaced wire shaping heads above but rearwardly of said cams and normally in part in advance of said supporting means, spring means acting on said anvil for normally positioning said cams in part within said openings and in part across said guideway and for positioning said anvil heads into said guideway, a reciprocable forming blade normally above said heads but adapted on its downstroke to bend said foremost staple element against said heads to define a staple and having means effective on said downstroke and cooperating with said cams for urging said anvil rearwardly relative to said guideway against the resistance of said spring means to withdraw said cams from said openings and said heads from said guideway and having means in part constituting a raceway for reception of said staple, actuator means on said anvil and effective on rearward displacement of said anvil by said former blade to rearwardly shift said pawls to displace said teeth and said terminal means together and idly under and over said belt, a reciprocable driving blade normally raised above said shaping means and idle on the downstroke of said former blade but movably guided in said raceway on its downstroke while said forming blade is fully depressed for expelling said staple out of said raceway, means carried by said housing for depressing said former blade and thereafter depressing said driving blade while said former blade is depressed and having means operable pursuant to expelling of said staple for elevating said blades above said heads, and spring means acting on said belt feeding means to cause said terminal means and pawls to grasp and shift said belt forwardly to present the now foremost element thereof on said heads.

33. A stapling tacker for utilizing a flexible and resilient staple element belt having a series of juxtapositioned substantially rectilinear wire elements, comprising; a carrier, a support fixed to said carrier and embodying a bridge for sustaining said belt, a bending block movably guided by said support and having anvil heads movably straddling said bridge, and spring means for urging said bending block in part forwardly of said carrier and support to present said heads normally in advance of said bridge to sustain the foremost element of said belt independent of said bridge.

34. A stapling tacker for utilizing a flexible and resilient staple element belt having a series of juxtapositioned substantially rectilinear wire elements, comprising; a carrier, a support fixed to said carrier and embodying a bridge for sustaining said belt, a bending block movably guided by said support and having anvil heads movably straddling said bridge and having cam means disposed below and in advance of said heads, and spring means for urging said block in part forwardly of said carrier and support to present said heads normally in advance of said bridge to sustain the foremost element of said belt independent of said bridge and said cam means in advance of said support and carrier.

35. A stapling tacker for utilizing a flexible and resilient staple element belt having a series of juxtapositioned substantially rectilinear wire elements, comprising; a U-shaped support within and fixed to said carrier and embodying a bridge extending above said carrier for sustaining said belt, a U-shaped bending block slidably guided within said support and having spaced anvil heads movably straddling said bridge, cam means disposed below and forwardly of said anvil heads and carried by said block, and spring means for urging said block in part forwardly of said carrier and support to present said heads normally in advance of said bridge to sustain the foremost element of said belt independent of said bridge.

36. A stapling tacker for utilizing a flexible and resilient staple element belt having a series of juxtapositioned substantially rectilinear wire elements, comprising; a carrier, a support fixed to said carrier and embodying a bridge for sustaining said belt, an anvil movably guided by said support and having heads movably straddling said bridge, spring means for urging said anvil in part forwardly of said carrier and support to present said heads normally in advance of said bridge to sustain the foremost staple of said belt independent of said bridge, a latch movably traversing said carrier, support and anvil and having manipulatable means for displacing said anvil in a direction towards the rear of said support and carrier, and resilient means to normally resist said displacement of said latch and to urge said latch in a direction towards the front end of said carrier.

37. A stapling tacker for utilizing a flexible and resilient staple element belt having a series of juxtapositioned substantially rectilinear wire elements, comprising; a carrier, a support having spaced sides fixed to said carrier and embodying a bridge for sustaining said belt, an anvil having spaced sides guided between the sides of said support and having spaced heads movably straddling said bridge, spring means for urging said anvil in part forwardly of said carrier and support to present said heads normally in advance of said bridge to sustain the foremost staple of said belt independent of said bridge, said sides of said carrier, support and anvil having alined slots, a latch movably guided in said slots and having wings overhanging said carrier and having means for displacing said anvil in a direction towards the rear of said support and carrier, and resilient means to resist said displacement of said latch and to urge said latch in a direction towards the front end of said carrier.

38. A stapling tacker for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a latch movably traversing said base and having means for displacing said anvil in a direction towards the rear of said base, a housing carrying and removably receiving said base, keeper means carried by said housing, and resilient means to resist said displacement of said latch and to urge said latch to interlock with said keeper.

39. A stapling tacker for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a latch movably traversing said base and having rearwardly disposed means for displacing said anvil in a direction towards the rear of said base and having forwardly arranged extensions, a housing swingably carrying and removably receiving said base, keeper means carried by said housing, and resilient means to resist said displacement of said latch and to urge said latch towards the front part of said base for removably interlocking said extensions with said keeper means.

40. A stapling tacker for utilizing a flexible and resilient staple element belt having a series of juxtapositioned substantially rectilinear wire elements, comprising;

a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a latch movably traversing said base and having means for displacing said anvil in a direction towards the rear of said base, a housing for removably receiving said base, means swingably holding the rear end of said base to the rear end of said housing, keeper means carried by said housing, and resilient means to resist said displacement of said latch and to urge said latch to interlock with said keeper.

41. A stapling tacker for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a latch movably traversing said base and having means for displacing said anvil in a direction towards the rear of said base, a housing for removably receiving said base, means movably holding said base to said housing, keeper means carried by said housing, resilient means to resist said displacement of said latch and to urge said latch to interlock with said keeper, and guide means above said bridge and secured to the front wall of said housing and defining therewith a passageway and having a rearwardly disposed platen constituting with said bridge a channel for directing said belt towards said heads.

42. A stapling tacker for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a latch movably traversing said base and having means for displacing said anvil in a direction towards the rear of said base, a housing for removably receiving said base, means movably holding said base to said housing, keeper means carried by said housing, resilient means to resist said displacement of said latch and to urge said latch to interlock with said keeper to preclude displacement of said base relative to said housing, guide means above said bridge and defining with the front wall of said housing a passageway and having a rearwardly disposed platen constituting with said bridge a channel for directing said belt towards said heads, reciprocable forming and driving blades slidably guided in said passageway, and means for depressing said forming blade and for depressing said driving blade while said forming blade is depressed.

43. A stapling tacker for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said support to sustain the foremost staple of said belt independent of said bridge, a latch movably traversing and displaceable longitudinally of said base and having spaced means for displacing said anvil in a direction towards the rear of said base, a housing for receiving said base, said housing and base at the rear ends thereof having a connection movably sustaining said base on said housing, keeper means carried by said housing, resilient means to resist said displacement of said latch longitudinally of said base and to urge said latch to interlock with said keeper upon completion of reception of said base within said housing to preclude displacement of said base relative to said housing.

44. A stapling tacker for utilizing a flexible and resilient staple element belt having a series of juxtapositioned substantially resilient wire elements, comprising; a base embodying a fixed support having a bridge for sustaining the front end of said belt, an anvil movably guided by and within said support and having spaced heads, spring means for urging said anvil in part forwardly of said support to present said heads normally in advance of said support to sustain the foremost staple of said belt independent of said support, a latch slidably guided by and lengthwise of said base and having means for displacing said anvil in a direction towards the rear of said base, a housing having spaced sides for removably receiving said base, said housing and base having a connection movably sustaining said base on said housing, keeper means carried by said housing, resilient means to resist said displacement of said latch and to urge said latch to interlock with said keeper to preclude displacement of said base out of said housing.

45. A stapling tacker for utilizing a flexible and resilient staple element belt having a series of juxtapositioned substantially resilient wire elements, comprising; a base embodying a fixed support for sustaining said belt, an anvil movably guided by said support and having spaced heads, spring means for urging said anvil in part forwardly of said support to present said heads normally in advance of said support to sustain the foremost staple of said belt independent of said support, a latch slidably traversing said base and movable longitudinally of said support and having means for displacing said anvil in a direction towards the rear of said base, a housing having spaced sides for removably receiving said base, a connection swingably sustaining said base on said housing, keeper means carried by said housing and comprising cam means for actuating said latch and embodying reentrant means resilient means to resist said displacement of said latch and to urge said latch to abut said cam means on moving said base between the sides of and into said housing and to interlock with the walls of said reentrant means to preclude displacement of said base out of said housing.

46. A stapling tacker for utilizing a flexible and resilient staple element belt having a series of juxtapositioned substantially rectilinear wire elements, comprising; a carrier having spaced sides, a support for sustaining said belt and having spaced sides fixed to said spaced sides of said carrier, an anvil having spaced sides movably guided between the sides of said support and having spaced heads, spring means for urging said anvil in part forwardly of said carrier and support to present said heads normally in advance of said support to sustain the foremost staple of said belt independent of said support, said sides of said carrier, support and anvil having alined slots, a latch movably guided in said slots and having manipulatable wings overhanging said carrier for displacing said anvil in a direction towards the rear of said support and carrier, and resilient means to resist said displacement of said latch and to urge said latch in a direction towards the front end of said carrier.

47. A stapling tacker for utilizing a flexible and resilient staple element belt having a series of juxtapositioned substantially rectilinear wire elements, comprising; a carrier having spaced sides, a support having spaced sides fixed to the spaced sides of said carrier and embodying a bridge for sustaining said belt, an anvil having spaced sides guided between the sides of said support and having spaced heads movably straddling said bridge, spring means for urging said anvil in part forwardly of said carrier and support to present said heads normally in advance of said bridge to sustain the foremost staple of said belt independent of said bridge, said sides of said carrier, support and having alined slots, a latch movably guided in said slots and having manipulatable wings overhanging said carrier for displacing said anvil in a direction towards the rear of said support and carrier, resilient means to resist said displacement of said latch and to urge said latch in a direction towards the front end of said carrier, belt feeding means comprising resilient terminals for removably gripping said upper part of said belt and tooth means for removably gripping the lower part of said belt, and actuator means carried by said anvil for shifting said feeding means idly relative to said belt upon movement of said anvil in one direction and for advancing said belt when said anvil is displaced in an opposite direction.

48. A stapling tacker for utilizing a flexible and resilient staple element belt having a series of juxtapositioned substantially rectilinear wire elements, comprising a carrier having spaced sides including alined slots defining upper and lower walls, a support for sustaining the front part of said belt and fixed to said carrier and having spaced sides, an anvil having spaced sides guided between the sides of said support and having spaced heads, the sides of said anvil having alined slots defining lower walls substantially in alinement with said lower walls of said carrier, the spaced sides of said support having alined slots defining lower alined walls at a higher elevation than said lower walls of said carrier and anvil and constituting abutments, spring means for urging said anvil in part forwardly of said carrier and support to present said heads normally in advance thereof to sustain the foremost staple of said belt independent of said carrier and support, a latch movably guided in said slots and seated on said abutments and having wings overhanging said carrier, means for displacing said anvil in a direction towards the rear of said support and carrier against the resistance of said spring means, and resilient means to resist said displacement of said latch and to urge said latch in a direction towards the front end of said carrier.

49. A stapling tacker for utilizing a flexible and resilient staple element belt having a series of juxtapositioned substantially rectilinear wire elements, comprising a carrier having spaced sides including alined slots defining upper and lower walls, a support for sustaining the front part of said belt and in part disposed within and fixed to said carrier and having spaced sides, an anvil having spaced sides guided between the sides of said support and having spaced heads, the sides of said anvil having alined slots defining lower walls substantially in alinement with said lower walls of said carrier, the spaced sides of said support having alined slots defining lower alined walls at a higher elevation than said lower walls of said carrier and anvil and constituting abutments, spring means for urging said anvil in part forwardly of said carrier and support to present said heads normally in advance thereof to sustain the foremost staple of said belt independent of said carrier and support, a latch slidably guided in said slots and seated on said abutments and free of said lower walls of said carrier and anvil and having wings overhanging said carrier for displacing said anvil in a direction towards the rear of said support and carrier, a housing for receiving said carrier and having keeper means, means swingably holding the rear end of said carrier to the rear end of said housing, and resilient means to resist said displacement of said latch and to urge said latch in a direction towards the front end of said carrier for interlocking with said keeper means upon shifting of said carrier into said housing.

50. A stapling tacker for utilizing a flexible and resilient staple element belt having a series of juxtapositioned substantially rectilinear wire elements, comprising a U-shaped carrier having spaced sides including alined slots defining upper and lower walls, a support in part disposed within and fixed to said carrier and having a bridge outside of said carrier for sustaining the front part of said belt and fixed to said carrier and having spaced sides interconnected by said bridge, a U-shaped anvil having spaced sides slidably guided between the sides of said support and having spaced heads movably straddling said bridge, the sides of said anvil having alined slots defining lower walls in alinement with said lower walls of said carrier, the spaced sides of said support having alined slots defining lower walls at a higher elevation than said lower walls of said carrier and anvil and constituting abutments, spring means for urging said anvil in part forwardly of said carrier and support to present said heads normally in advance of said bridge to sustain the foremost staple of said belt independent of said bridge, a latch movably guided in said slots and seated on said abutments and free of said lower walls of said anvil and carrier and having wings overhanging said carrier for displacing said anvil in a direction towards the rear of said support and carrier, a housing for receiving said carrier and having keeper means, means swingably connecting said carrier to said housing, and resilient means to resist said displacement of said latch and to urge said latch in a direction towards the front end of said carrier for removably interlocking with said keeper means upon swingably shifting said carrier into said housing.

51. A fastening machine for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a housing having a front wall embodying a lower part below the elevation of said bridge and spaced forwardly of said anvil and in part defining a guideway and embodying an upper part above the elevation of said bridge, said housing having spaced sides extending rearwardly of said lower part for receiving said base therebetween, and guide means within said housing and above said bridge and secured to said upper part and defining therewith a passageway above and in alinement with said guideway and having a rearwardly disposed platen constituting with said bridge a channel for directing said belt towards said heads.

52. A fastening machine for utilizing a flexible and resilient staple element belt having a series of juxatpositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a housing having a front wall embodying a lower part below the elevation of said bridge and spaced forwardly of said anvil and in part defining a guideway and embodying an upper part above the elevation of said bridge, said housing having spaced sides extending rearwardly of said lower part for receiving said base therebetween, and channel shaped guide means within said housing and above said bridge and having spaced wings secured to said upper part and web means offset relative to said wings and defining with said upper part a passageway above and in alinement with said guideway and having a rearwardly disposed platen constituting with said bridge a channel for directing said belt towards said heads.

53. A fastening machine for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a housing having a front wall embodying a lower part below the elevation of said bridge and spaced forwardly of said anvil and in part defining a guideway and embodying an upper part above the elevation of said bridge, said housing having spaced sides extending rearwardly of said lower part for receiving said base therebetween, guide means within said housing and above said bridge and secured to said upper part and defining therewith a passageway above and in alinement with said guideway, and stop means carried by said guide means coacting to align said foremost element in said guideway.

54. A fastening machine for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a housing having a front wall embodying a lower part below the elevation of said bridge and spaced forwardly of said anvil and in part defining a guideway and embodying an upper part above the elevation of said bridge, said housing embodying spaced sides extending rearwardly of said lower part for receiving said base therebetween, guide means within said housing and above said bridge and secured to said upper part and defining therewith a passageway above and in alinement with said guideway and having a rearwardly disposed platen constituting with said bridge a channel for directing said belt towards said heads, and space stop means carried by said guide means coacting to aline said foremost element in said guideway.

55. A fastening machine for utilizing a flexible and resilient staple element belt having a series of juxtapositioned substantially rectilinear wire elements, comprising; a base embodying a fixed support having a bridge for sustaining said belt, an anvil movably guided by said support and having heads movably straddling said bridge, spring means for urging said anvil in part forwardly of said support to present said heads normally in advance of said bridge to sustain the foremost staple of said belt independent of said bridge, a housing having a front wall embodying a lower part below the elevation of said bridge and spaced forwardly of said anvil and in part defining a guideway and embodying an upper part above the elevation of said bridge, said housing embodying spaced sides extending rearwardly of said lower part for receiving said base therebetween, and channel shaped guide means within said housing and above said bridge and having spaced laterally extending wings secured to said upper part and web means offset relative to said wings and defining with said upper part a passageway above and in alinement with said guideway and having a rearwardly disposed platen integral with said web means constituting with said bridge a channel for directing said belt towards said heads, and said wings constituting stop means to aline said foremost element in said guideway.

56. A fastening machine for utilizing a flexible and resilient staple element belt having a series of juxtapositioned substantially rectilinear wire elements, comprising; a base embodying a support, an anvil movably guided by said support, a housing having a front wall embodying a lower part below the elevation of the upper portion of said anvil and spaced forwardly of said anvil and in part defining a guideway and embodying an upper part above the elevation of said upper portion, said housing embodying spaced sides extending rearwardly of said lower part for receiving said base therebetween, and guide means within said housing and above said support and secured to said upper part and defining therewith a passageway above and in alinement with said guideway and having a rearwardly disposed platen constituting with said support a channel for directing said belt towards said guideway.

57. A fastening machine for utilizing a flexible and resilient staple element belt having a series of juxtapositioned substantially rectilinear wire elements, comprising; a base embodying a support, an anvil movably guided by said support, a housing having a front wall embodying a lower part below the elevation of the upper portion of said anvil and spaced forwardly of said anvil and in part defining a guideway and embodying an upper part above the elevation of said upper portion, said housing embodying spaced sides extending rearwardly of said lower part for receiving said base therebetween, and channel shaped guide means within said housing and above said support and having wings secured to said upper part and having web means defining therewith a passageway above and in alinement with said guideway and having a platen extending rearwardly from the lower part of said web means and constituting with said support a channel for directing said belt into said guideway.

58. A fastening machine for utilizing a flexible and resilient staple element belt having a series of juxtapositioned substantially rectilinear wire elements, comprising; a base embodying a support, an anvil movably guided by said support, a housing having a front wall embodying a lower part below the elevation of the upper portion of said anvil and spaced forwardly of said anvil and in part defining a guideway, said housing embodying spaced sides extending rearwardly of said lower part for receiving said base therebetween, guide means within said housing and above said support and secured to said upper part and defining therewith a passageway above and in alinement with said guideway and having a rearwardly disposed platen constituting with said support a channel for directing said belt into said guideway, and belt feeding means in part straddling said support for intermittently shifting said belt towards said guideway.

59. A fastening machine for utilizing a flexible and resilient staple element belt having a series of juxtapositioned substantially rectilinear wire elements, comprising; a base embodying a support having a bridge including a tongue, an anvil movably guided by said support, a housing having a front wall embodying a lower part below the elevation of the upper portion of said anvil and spaced forwardly of said anvil and in part defining a guideway, said housing embodying an upper part above the elevation of said upper portion and including spaced sides extending rearwardly of said lower part for receiving said base therebetween, guide means within said housing and above said bridge and secured to said upper part and defining therewith a passageway above and in alinement with said guideway and having a rearwardly disposed platen constituting with said bridge a channel for directing said belt towards said guideway, and belt feeding means straddling said tongue and having means for intermittently shifting said belt towards said guideway.

60. A fastening machine for utilizing a flexible and resilient staple element belt having a series of juxtapositioned substantially rectilinear wire elements, comprising; a base embodying a support having a bridge, an anvil movably guided by said support, a housing having a front wall embodying a lower part below the elevation of the upper portion of said anvil and spaced forwardly of said anvil and in part defining a guideway and embodying an upper part above the elevation of said upper portion, said housing embodying spaced sides extending rearwardly of said lower part for receiving said base therebetween, guide means within said housing and above said bridge and secured to said upper part and defining therewith a passageway above and in alinement with said guideway and having a rearwardly disposed platen constituting with said bridge a channel for directing said belt towards said guideway, belt feeding means straddling a front part of said bridge and having spaced grasping means for intermittently shifting said belt towards said guideway, actuator means carried by said anvil for operating said belt feeding means, and means swingably and slidably sustaining said feeding means.

61. A fastening machine for utilizing a flexible and resilient staple element belt having a series of juxtapositioned substantially rectilinear wire elements, comprising; a base embodying a support having a tongue, an anvil movably guided by said support, a housing having a front wall embodying a lower part below the elevation of the upper portion of said anvil and spaced forwardly of said anvil and in part defining a guideway and embodying an upper part above the elevation of said upper portion, said housing embodying spaced sides extending rearwardly of said lower part for receiving said base therebetween, guide means within said housing and above said bridge and secured to said upper part and defining therewith a passageway above and in alinement with said guideway and having a rearwardly disposed platen constituting with said bridge a channel for directing said belt towards said guideway, belt feeding means straddling said tongue and having spaced fingers for intermittently shifting said belt towards said guideway, and actuator means carried by said anvil for operating said belt feeding means.

62. A fastening machine for utilizing a flexible and resilient staple element belt having a series of juxtapositioned substantially rectilinear wire elements, comprising; a base embodying a support having a bridge, an anvil movably guided by said support, a housing having a front wall embodying a lower part below the elevation of the upper portion of said anvil and spaced forwardly of said anvil and in part defining a guideway and embodying an upper part above the elevation of said upper portion, said housing embodying spaced sides extending rearwardly of said lower part for receiving said base therebetween, guide means within said housing and above said bridge and secured to said upper part and defining therewith a passageway above and in alinement with said guideway and having a rearwardly disposed platen constituting with said bridge a channel for directing said belt towards said guideway, belt feeding means having spaced grasping means for intermittently shifting said belt towards said guideway, means movably guiding said feeding means, spring means resisting displacement of said feeding means, actuator means carried by said anvil for operating said belt feeding means against the resistance of said spring means.

63. A fastening machine for utilizing a flexible and resilient staple element belt having a series of juxtapositioned substantially rectilinear wire elements, comprising; a base embodying a support having a bridge, an anvil movably guided by said support, a housing at least in part defining a guideway for receiving the foremost element of said belt and having a rearwardly disposed platen constituting with said bridge a channel for directing said belt towards said guideway, belt feeding means straddling a front part of said support and having vertically spaced grasping means for intermittently shifting said belt towards said guideway, actuator means carried by said anvil for operating said belt feeding means, a keeper carried by said housing and having a seat, a cartridge containing said belt and removably mounted on said seat and having spaced rails for guiding said belt into said channel, and spring means coacting with said cartridge for urging said grasping means to shift said belt towards said guideway.

64. A fastening machine for utilizing a flexible and resilient staple element belt having a series of juxtapositioned substantially rectilinear wire elements, comprising; a base embodying a support having a bridge including a tongue, an anvil movably guided by said support, a housing in part constituting a guideway for receiving the foremost element of said belt and having a rearwardly disposed platen constituting with said bridge a channel for directing said belt towards said guideway, belt feeding means straddling said bridge and having a vertically spaced grasping means for intermittently shifting said belt towards said tongue, actuator means carried by said anvil for operating said belt feeding means, a keeper carried by said housing and having a seat, a cartridge containing said belt and removably mounted on said seat and having spaced rails removably straddling said tongue for guiding said belt into said channel, spring means coacting with said cartridge for urging said grasping means to shift said belt towards said guideway, and a strap removably holding said cartridge on said seat.

65. A fastening machine for utilizing a flexible and resilient staple element belt having a series of juxtapositioned substantially rectilinear wire elements, comprising; a base embodying a support having a bridge including a tongue, an anvil movably guided by said support, a housing in part constituting a guideway for receiving the foremost element of said belt and having a rearwardly disposed platen constituting with said bridge a channel for directing said belt towards said guideway, belt feeding means straddling said tongue and having vertically spaced grasping means for intermittently shifting said belt towards said guideway, actuator means carried by said anvil for operating said belt feeding means, a keeper carried by said housing and having a seat, a cartridge containing said belt and removably mounted on said seat and having spaced rails for guiding said belt into said channel, spring means coacting with said cartridge for urging said grasping means to shift said belt towards said guideway, means for removably holding said cartridge on said seat, means pivotally securing the rear end of said base to the rear end of said housing, and a latch movably mounted on said base for removably interlocking with said keeper.

66. A fastening machine for utilizing a flexible and resilient staple element belt having a series of juxtapositioned substantially rectilinear wire elements, comprising; a cylinder, a base embodying a support having a bridge including a tongue reduced relative to said bridge, an anvil movably guided by said support, a housing defining in part a guideway to receive the foremost element of said belt and secured to said cylinder and having depending sides for receiving said base therebetween and having a rearwardly disposed platen constituting with said bridge and tongue a channel for directing said belt towards said guideway, belt feeding means, means movably carrying said feeding means, a keeper carried by said housing and having a seat, a cartridge containing said belt and removably mounted on said seat and having spaced rails removably straddling said tongue for guiding said belt towards said guideway, spring means coacting with said cartridge for urging said feeding means to shift said belt towards said guideway, means swingably holding said base to said housing, and latch means for removably locking said base to said keeper.

67. A fastening machine for utilizing a flexible and resilient staple element belt having a series of juxtapositioned substantially rectilinear wire elements, comprising; a cylinder, a base embodying a support having a bridge, an anvil movably guided by said support, a housing in part defining a guideway for receiving the foremost element of said belt and secured to said cylinder and having depending sides for removably receiving said base and having a rearwardly disposed platen constituting with said guideway a channel for directing said belt towards said guideway, belt feeding means, means movably carrying said feeding means, a keeper carried by said housing and having a seat, a cartridge containing said belt and removably mounted on said seat and having spaced rails removably straddling said bridge and platen for guiding said belt towards said guideway, spring means comprising spaced arms coacting with said cartridge and feeding means for urging said feeding means to shift said belt towards said guideway, means swingably holding said base to said housing, and shiftable latch means for removably locking said base to said keeper.

68. A fastening machine for utilizing a flexible and resilient staple element belt having a series of juxtapositioned substantially rectilinear wire elements, comprising; means containing staple forming and driving means, a base embodying a support having a bridge, an anvil movably guided by said support, a housing in part defining a guideway to receive the foremost element of said belt and secured to said means containing said forming and driving means and having depending sides for receiving said base therebetween and having a rearwardly disposed platen constituting with said bridge a channel for directing said belt towards said guideway, belt feeding means, means swingably and slidably carrying said feeding means, a keeper carried by said housing and having a seat, a cartridge containing said belt and removably mounted on said seat and having spaced rails removably straddling said bridge and platen for guiding said belt into said channel, spring means coacting with said cartridge for urging said feeding means to shift said belt towards said guideway, means swingably holding said base to said housing to permit said base to pivot out of said housing, and latch means for removably locking said base to said keeper pursuant to swinging of said base within said housing.

69. A fastening machine for utilizing a flexible and resilient staple element belt having a series of juxtapositioned substantially rectilinear wire elements, comprising; a cylinder, a base embodying a support having a bridge in part defining a channel, belt feeding means, means movably carrying said feeding means and disposed below said cylinder, a seat carried by said housing, a cartridge containing said belt and removably mounted on said seat and having spaced rails removably straddling said bridge for guiding said belt into said channel, and spring means coacting with said cartridge for urging said feeding means to shift said belt in a direction towards the front end of said channel.

70. A fastening machine for utilizing a flexible and resilient staple element belt having a series of juxtapositioned substantially rectilinear wire elements, comprising; a cylinder, a base below said cylinder and embodying a support having a bridge in part defining a channel, belt feeding means, means swingably and slidably carrying said feeding means, a seat carried by said housing, a cartridge containing said belt and removably mounted on said seat and having spaced rails removably straddling said bridge for guiding said belt into said channel, spring means for urging said feeding means to shift said belt in a direction towards the front end of said channel, and a strap connected to said cylinder and base for removably holding said cartridge on said seat.

71. In a pneumatic fastening device, a cylinder, a valve to admit compressed air into said cylinder, a housing secured to said cylinder and defining in part a guideway, a base carried by said housing having a movable anvil, guide means within and secured to said housing to define a passageway in communication with said guideway and having means defining with said base a channel in communication with said passageway and guideway, an open top primary piston slidably guided within said cylinder, a forming blade secured to said primary piston and slidably guided in said passageway and removably guided in said guideway, a second piston slidably guided within said primary piston, a driving blade secured to said secondary piston and slidably guided by said forming piston and in part defining therewith a raceway, fixed means carried by said cylinder and spaced from said primary piston, sealing means carried by said fixed means and normally within said primary piston to preclude compressed air from reaching said secondary piston, spring means to normally hold said primary piston raised in part above the elevation of said secondary piston and in part above said sealing means and to normally hold forming blade above said channel, manipulatable means to open said valve to permit ingress of compressed air into said cylinder and about and within said primary piston for downwardly displacing said forming blade passed said channel and into said guideway, and means to limit displacement of said forming blade in said guideway.

72. In a pneumatic fastening device, a cylinder, a valve to admit compressed air into said cylinder, a housing secured to said cylinder and defining in part a guideway, a base carried by said housing having a movable anvil, guide means within and secured to said housing to define a passageway in communication with said guideway and having means defining with said base a channel in communication with said passageway and guideway, an open top primary piston slidably guided within said cylinder, a forming blade secured to said primary piston and slidably guided in said passageway and removably guided in said guideway, a secondary piston slidably guided within said primary piston, a driving blade secured to said secondary piston and slidably guided by said forming piston and in part defining therewith a raceway, fixed means carried by said cylinder and spaced from said primary piston, a sealing cup carried by said fixed means and normally nested within said primary piston and cooperating therewith to preclude compressed air from reaching said secondary piston through said open top, spring means to normally hold said primary piston raised in part above the elevation of said secondary piston and in part above said cup means and to normally hold forming blade above said channel, manipulatable means to open said valve to permit ingress of compressed air into said cylinder and about and within said primary piston for downwardly displacing said forming blade passed said channel and into said guideway, and means to limit displacement of said forming blade in said guideway.

73. In a pneumatic fastening device, a cylinder, a valve to admit compressed air into said cylinder, a housing secured to said cylinder and defining in part a guideway, a base carried by said housing having a movable anvil, guide means within and secured to said housing to define a passageway in communication with said guideway and having means defining with said base a channel in communication with said passageway and guideway, an open top primary hollow cylindrical piston slidably guided within said cylinder, a forming blade secured to said primary piston and slidably guided in said passageway and removably guided in said guideway, a secondary piston slidably guided within the bore of said primary piston and normally disposed at the lower part of said bore, a driving blade secured to said secondary piston and slidably guided by said forming piston and in part defining therewith a raceway, fixed means carried by said cylinder and spaced from said primary piston, a sealing cup carried by said fixed means and normally within and cooperating with the wall of said bore to preclude compressed air from reaching said secondary piston, spring means to normally hold said primary piston raised in part above the elevation of said secondary piston and in part above said cup and to normally hold forming blade above said channel, manipulatable means to open said valve to permit ingress of compressed air into said cylinder and about and within said primary piston for downwardly displacing said forming blade passed said channel and into said guideway, and means to limit displacement of said forming blade in said guideway.

74. In a pneumatic fastening device, a cylinder, a valve to admit compressed air into said cylinder, a housing secured to said cylinder and defining in part a guideway, a base carried by said housing having a movable anvil, guide means within and secured to said housing to define a passageway in communication with said guideway and having means defining with said base a channel in communication with said passageway and guideway, an open top primary hollow piston slidably guided within said cylinder, a forming blade secured to said primary piston and slidably guided in said passageway and removably guided in said guideway, a secondary piston slidably guided within the bore of said primary piston and normally disposed at the lower part of said bore, a driving blade secured to said secondary piston and slidably guided by said forming piston and in part defining therewith a raceway, fixed means carried by said cylinder and spaced from said primary piston, a sealing cup carried by said fixed means and normally within and cooperating with the wall of said bore to preclude compressed air from reaching said secondary piston, helicoidal spring means to normally hold said primary piston raised in part above the elevation of said secondary piston and in part above said cup and to normally hold forming blade above said channel, manipulatable means responsive to finger pressure for opening said valve to permit ingress of compressed air into said cylinder and about and within said primary piston for downwardly displacing the latter and for compressing said spring means and also correspondingly downwardly displacing said forming blade passed said channel and into said guideway and for maintaining said primary piston depressed, means to limit downward displacement of said forming blade in said guideway, said primary piston towards its completion of its downward displacement moving away from said cup to permit a sudden blast of compressed air into said bore for displacing said secondary piston downwardly in said bore and correspondingly shifting driving blade downwardly into said raceway while said primary piston is depressed, stop means to limit downward displacement of said secondary piston, and said primary piston having means cooperating with said secondary piston to elevate the latter upon removal of finger pressure on said manipulating means at which time said valve closes and said spring means expands to elevate said primary piston.

75. In a pneumatic fastening device, a cylinder having a bore and embodying a hollow handle communicating with said bore, a valve carried by said handle to admit or prevent the admission of compressed air into said cylinder, a housing secured to said cylinder and defining in part a guideway, a base carried by said housing and having a movable anvil, guide means within and secured to said housing to define a passageway in alinement with and communicating with said guideway and having means defining with said base a channel in communication with said passageway and guideway, an open top primary piston embodying a shell spaced from the wall of said bore and having a bead cooperating with said wall to tiltably and slidably guide said forming piston relative to said cylinder, a forming blade secured to said primary piston and slidably guided in said passageway and removeably guided in said guideway, a secondary piston slidably guided within said primary piston, a driving blade secured to said secondary piston and slidably guided by said forming piston and in part defining therewith a raceway, fixed means carried by said cylinder and spaced from said primary piston, sealing means carried by said fixed means and normally within and engaging said primary piston to preclude compressed air from reaching said secondary piston, spring means to normally hold said primary piston raised in part above the elevation of said secondary piston and in part above said sealing means and to normally hold forming blade above said channel, manipulatable means to open said valve to permit ingress of compressed air into said cylinder and about and within said primary piston for downwardly displacing said primary piston away from and out of contact with said sealing means and for displacing said forming blade passed said channel and into said guideway for actuating said anvil, and means to limit displacement of said forming blade in said guideway.

76. A fastening machine adapted to use a staple element containing cartridge; comprising, a hollow housing having an open bottom and having means for supporting said cartridge, a base movable into or out of said housing through said open bottom, said housing and base having means swingably holding the rear end of said base to the rear end of said housing, a strap swingable relative to said housing, locking means for limiting full insertion of said base within said housing, and said strap and base having disengagable interlocking means for tightening said strap against said cartridge upon full insertion of said base within said housing.

77. A fastening machine adapted to use a staple element containing cartridge, comprising; a hollow housing having an open bottom and having means for supporting said cartridge, a base movable into or out of said housing through said open bottom, said housing and base having means swingably holding the rear end of said base to the rear end of said housing, a strap, means swingably holding said strap relative to said housing, disengageable locking means carried by said housing and base for limiting full insertion of said base within said housing, and said strap and base having disengageable interlocking means for tightening said strap against said cartridge on full insertion of said base within said housing.

78. A fastening machine adapted to use a staple element containing cartridge, comprising; a hollow housing having an open bottom and having means for supporting said cartridge, a base movable into or out of said housing through said open bottom, said housing and base having means swingably holding the rear end of said base to the rear end of said housing, a resilient strap, means swingably holding said strap relative to said housing, disengageable locking means carried by said housing and base for limiting full insertion of said base within said housing, a hook on said strap, said base having means to disengageably interlock with said hook for tightening said strap against said cartridge on full insertion of said base within said housing.

79. The fastening machine according to claim 78 wherein said locking means comprises keeper means carried by said housing and slidable latch means carried by said base, and spring means to maintain said latch means interlocked with said keeper means.

80. The fastening machine according to claim 79 wherein upon unlocking of said latch means from said keeper means said base may be swung out of said housing for automatically unlocking said hook from said base to permit removal of said cartridge from said housing.

81. In combination, a cylinder, a valve to admit air into said cylinder, an open top primary hollow piston slidably guided within said cylinder and having a bore, a secondary piston slidably guided within the bore of said primary piston and normally disposed at the lower part of said bore, fixed means carried by said cylinder and spaced from said primary piston, a sealing cup carried by said fixed means and normally within and cooperating with the wall of said bore to preclude compressed air from reaching said secondary piston, helicoidal spring means to normally hold said primary piston raised and in part above the elevation of said secondary piston and in part above said cup, manipulatable means responsive to finger pressure for opening said valve to permit ingress of compressed air into said cylinder and about and within said primary piston for downwardly displacing the latter to compress said spring means, said primary piston towards its completion of its downward displacement moving away from said cup to permit a sudden blast of compressed air into said bore for displacing said secondary piston downwardly in said bore, stop means to limit downward displacement of said secondary piston, and said primary piston having means cooperating with said secondary piston to elevate the latter upon removal of finger pressure on said manipulable means at which time said valve closes and said spring means expands to elevate said primary piston.

82. In combination, a cylinder, a valve to admit air into said cylinder, an open top primary hollow piston slidably guided within said cylinder and having a bore, a secondary piston slidably guided within the bore of said primary piston and normally disposed at the lower part of said bore, a cap secured to said cylinder and spaced above said primary piston, fixed means carried by said cap and disposed axially of and at least in part within said primary piston, a sealing cup carried by said fixed means and normally within and cooperating with the wall of said bore to preclude compressed air from reaching said secondary piston, helicoidal spring means to normally hold said primary piston raised and in part above the elevation of said secondary piston and in part above said cup, manipulatable means responsive to finger pressure for opening said valve to permit ingress of compressed air into said cylinder and about and within said primary piston for downwardly displacing the latter to compress said spring means, said primary piston towards its completion of its downward displacement moving away from said cup to permit a sudden blast of compressed air into said bore for displacing said secondary piston downwardly in said bore, stop means to limit downward displacement of said secondary piston, and said primary piston having means cooperating with said secondary piston to elevate the latter upon removal of finger pressure on said manipulatable means at which time said valve closes and said spring means expands to elevate said primary piston.

83. In combination, a cylinder having a bore and including a hollow handle communicating with said bore, a valve carried by said handle to admit or prevent the admission of compressed air into said cylinder, an open top primary piston embodying a shell spaced from the wall of said bore and having a bead cooperating with said wall to tiltably and movably guide said forming piston relative to said cylinder, a secondary piston slidably guided within said primary piston, fixed means carried by said cylinder and spaced from said primary piston, sealing means carried by said fixed means and normally within and engaging said primary piston to preclude compressed air from reaching said secondary piston, spring means to normally hold said primary piston raised in part above the elevation of said secondary piston and in part above said sealing means, manipulatable means to open said valve to permit ingress of compressed air into said cylinder and about and within said primary piston for downwardly displacing said primary piston away from and out of contact with said sealing means.

84. In a fastening machine, a carrier, a support secured to said carrier, a bending block slidably guided relative to said carrier and having cam means, a braking pawl pivoted relative to said carrier, and spring means interconnecting said pawl and block to normally hold said cam means in advance of said carrier.

85. In a fastening machine, a U-shaped carrier having spaced sides, an inverted U-shaped support having depending sides fixedly interposed between said spaced sides and having a bridge disposed above said carrier and including a tongue, a U-shaped bending block within and slidably guided by the spaced sides of said support and having spaced anvil heads movably straddling said tongue; cams below and in advance of said heads, and spring means to hold said heads in part in advance of said tongue and cams in advance of said carrier.

86. The fastening machine according to claim 85 wherein a pin is fixedly carried by said bending block below said heads and having ends projecting laterally of said block.

87. The fastening machine according to claim 86 wherein said tongue and support define spaced shoulders, a braking block having spaced fingers straddling said tongue, means pivotally maintaining said pawl relative to said carrier, and said spring means interconnecting said pawl and bending block to normally hold said cams and heads in advance of said carrier and said heads in advance of said tongue and said fingers against said shoulders.

88. A fastening machine, comprising; a housing having a front wall in part defining a guideway and including spaced relief openings, a base having a carrier, anvil means slidably guided in said carrier and including spaced anvil heads and spaced cam means disposed below and forwardly of said head, and spring means coacting with said anvil means to arrange said heads in part in said guideway and said cam means across said guideway and in part into said openings.

89. The fastening machine according to claim 88 wherein said cam means and relief openings limit displacement of said heads into said guideway.

90. The fastening machine according to claim 88 wherein said housing has rearwardly extending and depending spaced sides carrying fulcrum means at the rear end thereof, said base having spaced sides including rear ends swingably carried by said fulcrum means to permit said base to be swung into or out of said housing, latch means movably carried by said base, keeper means on said housing for removably interlocking with said latch means, and spring means acting on said latch means to hold the latter interlocked with said keeper means.

91. A fastening machine, comprising; a cylinder having a rearwardly disposed and depending reduced portion, staple element feeding means comprising spaced pawls straddling said reduced portion, and means swingably and slidably retaining said pawls relative to said reduced portion.

92. The fastening machine according to claim 91 wherein a pin is carried by said reduced portion, and said pawls having means swingably and slidably encompassing said pin.

93. The fastening machine according to claim 91 wherein said pawls carry an inverted U-shaped leaf spring having forwardly arranged spaced legs secured to said pawls, and fingers depending from said legs, said pawls having spaced tooth means disposed below and in alinement with said fingers.

94. A fastening machine for utilizing a staple element containing cartridge, comprising; a housing having a front wall and rearwardly extending spaced sides, said sides at the upper portions thereof having laterally extending shoulders and spaced extensions extending upwardly from and merging with said shoulders and outwardly offset relative to the lower parts of said sides to define spaced compartments for reception of the forward parts of said cartridge.

References Cited in the file of this patent

UNITED STATES PATENTS

| | | |
|---|---|---|
| 1,302,246 | Trace | Apr. 27, 1919 |
| 1,596,724 | Ensign | Aug. 17, 1926 |
| 1,610,632 | Svenson | Dec. 14, 1926 |
| 1,746,496 | Palmgren | Feb. 11, 1930 |
| 1,865,105 | Houplain | June 18, 1932 |
| 2,161,540 | Tager | June 6, 1939 |
| 2,174,708 | Sears | Oct. 3, 1939 |
| 2,459,313 | Franz | Jan. 18, 1949 |
| 2,580,444 | Lang | Jan. 1, 1952 |
| 2,580,505 | Balma | Jan. 1, 1952 |

FOREIGN PATENTS

| | | |
|---|---|---|
| 386,485 | Great Britain | Jan. 19, 1933 |